(12) United States Patent
Shibuya et al.

(10) Patent No.: US 11,579,350 B2
(45) Date of Patent: Feb. 14, 2023

(54) WIRE GRID POLARIZATION PLATE HAVING DIELECTRIC LAYER WITH CONCAVE PORTIONS

(71) Applicant: Dexerials Corporation, Tokyo (JP)

(72) Inventors: Kazuyuki Shibuya, Tokyo (JP); Shigeshi Sakakibara, Tokyo (JP); Toshiaki Sugawara, Tokyo (JP); Yusuke Matsuno, Tokyo (JP); Akio Takada, Tokyo (JP)

(73) Assignee: Dexerials Corporation, Tokyo (JP)

( * ) Notice: Subject to any disclaimer, the term of this patent is extended or adjusted under 35 U.S.C. 154(b) by 157 days.

(21) Appl. No.: 16/867,146

(22) Filed: May 5, 2020

(65) Prior Publication Data

US 2020/0355860 A1   Nov. 12, 2020

(30) Foreign Application Priority Data

May 8, 2019   (JP) .............................. JP2019-088511

(51) Int. Cl.
*G02B 5/30* (2006.01)
*G02F 1/1335* (2006.01)

(52) U.S. Cl.
CPC ......... *G02B 5/3058* (2013.01); *G02B 5/3008* (2013.01); *G02F 1/133548* (2021.01)

(58) Field of Classification Search
CPC .......... B82Y 20/00; B82Y 40/00; G02B 1/02; G02B 1/113; G02B 1/115; G02B 1/118; G02B 5/3008; G02B 5/3033; G02B 5/3058; G02B 2207/101; G02F 1/133548; H01L 2933/0083; H01L 31/02161; H01L 31/02168; H01L 33/20; H01L 33/32
See application file for complete search history.

(56) References Cited

U.S. PATENT DOCUMENTS

| | | | | |
|---|---|---|---|---|
| 2004/0218270 A1* | 11/2004 | Wang | .................... | G02B 5/3041 359/486.01 |
| 2004/0264350 A1* | 12/2004 | Ueki | .................... | G02B 5/3058 369/110.03 |

(Continued)

FOREIGN PATENT DOCUMENTS

| | | |
|---|---|---|
| CN | 1576907 A | 2/2005 |
| CN | 107111041 A | 8/2017 |

(Continued)

OTHER PUBLICATIONS

Office Action in counterpart Chinese Patent Application No. 202010334397.3 dated Apr. 27, 2022 (21 pages).

(Continued)

*Primary Examiner* — Ryan S Dunning
(74) *Attorney, Agent, or Firm* — Osha Bergman Watanabe & Burton LLP

(57) ABSTRACT

Provided is a wire grid polarization plate that has heat resistance and excellent polarization properties, and has durability even in a thin wire structure with a small pitch, and an optical apparatus and a manufacturing method of a polarization plate. A periodic lamellar structure is formed with a material forming arrangement by self-assembling performance, and then, is metallized, and thus, metal wires arranged at a small pitch are prepared, and the obtained wires are fixed by a dielectric material.

8 Claims, 15 Drawing Sheets

(56) References Cited

U.S. PATENT DOCUMENTS

| | | | | |
|---|---|---|---|---|
| 2009/0066885 A1* | 3/2009 | Kumai | ............... | G02B 5/3058 |
| | | | | 427/163.1 |
| 2018/0267221 A1 | 9/2018 | Oowada et al. | | |
| 2019/0137676 A1 | 5/2019 | Nam et al. | | |
| 2019/0154904 A1* | 5/2019 | Zha | ................ | H01L 27/1218 |
| 2019/0187350 A1* | 6/2019 | Yoshikawa | ......... | G02B 5/3058 |

FOREIGN PATENT DOCUMENTS

| | | |
|---|---|---|
| CN | 108474894 A | 8/2018 |
| JP | 2012-173441 A | 9/2012 |
| JP | 2016-536651 A | 11/2016 |
| WO | 2015/060939 A1 | 4/2015 |

OTHER PUBLICATIONS

Office Action issued in Chinese Application No. 202010334397.3; dated Oct. 8, 2022 (12 pages).

\* cited by examiner

WIRE GRID POLARIZATION PLATE HAVING DIELECTRIC LAYER WITH CONCAVE PORTIONS

This application is based on and claims the benefit of priority from Japanese Patent Application No. 2019-088511, filed on 8 May 2019, the content of which is incorporated herein by reference.

BACKGROUND OF THE INVENTION

Field of the Invention

The present invention relates to a polarization plate and an optical apparatus, and a manufacturing method of a polarization plate.

Related Art

In the related art, an absorption type wire grid type polarization element is proposed as a polarization element, in which metal grids at a pitch smaller than a wavelength of light in a use band are formed on a substrate, and a dielectric layer or the like is formed on the metal grids, and thus, one polarized component reflected from the metal grid is cancelled out by an interference effect, and other polarized components are transmitted.

It is preferable that the pitch of the wire grid type polarization element is less than ½ of a use wavelength, and in a case where the pitch exceeds the range, diffraction light is generated. For this reason, in general, the pitch is less than or equal to 200 nm. Then, a gap between the metal grids formed on the substrate is usually filled with the air.

In such a polarization element, high heat resistance has been required in accordance with an increase in the luminance of the recent liquid crystal projector. However, the wire grid type polarization element of the related art has a structure including a metal grid and an air layer, and thus, for example, the metal grid is degraded in a high temperature environment of higher than 350° C., and polarization properties may decrease.

Therefore, an embedded type wire grid polarization element is proposed (refer to Patent Document 1). That is, the embedded type wire grid polarization element is a wire grid polarization element in which the air layer in the gap between the metal grids of the wire grid polarization element is embedded with a resin or the like.

However, in the wire grid polarization element in which the gap between the wires is embedded, the polarization properties greatly decrease. For example, in order to embed a gap of a wire structure with a pitch of 150 nm, and to exhibit equivalent polarization properties to the gapped polarization element, it is necessary for the wire to have an extremely large aspect ratio of approximately 100, and such a wire is not capable of being prepared by the existing manufacturing technology.

In addition, in the polarization element, higher polarization properties are continuously required in accordance with an increase in the definition of the recent liquid crystal projector. Here, examples of a method for attaining higher polarization in the wire grid type polarization element include a method for arranging thin wires at a small pitch.

However, the thin wire can easily be physically damaged. Therefore, a polarization plate is proposed in which a sidebar is disposed along a side surface of each wire of the wire grid polarization plate (refer to Patent Document 2). Further, in Patent Document 2, a gap between the wires is embedded.

According to the polarization plate including the sidebar, described in Patent Document 2, it is possible to improve the durability of the polarization plate. In addition, it is possible to attain a wire grid polarization plate with a small pitch that is close to the manufacturing limit at that time.

However, in a wire configuration including the sidebar, the manufacturing is complicated. In addition, it is also difficult to deal with a smaller pitch.

Patent Document 1: Japanese Unexamined Patent Application, Publication No. 2012-173441

Patent Document 2: Japanese Unexamined Patent Application (Translation of PCT Application), Publication No. 2016-536651

SUMMARY OF THE INVENTION

The present invention has been made in consideration of the background art, and an object thereof is to provide a wire grid polarization plate that has a heat resistance and excellent polarization properties, and has durability even in a thin wire structure with a small pitch, and an optical apparatus including the polarization plate.

The present inventors have been focused on arrangement formation according to self-assembling performance, in order to attain a polarization plate with a small pitch. Then, it has been found that a periodic lamellar structure is formed by using a material forming arrangement by the self-assembling performance, and then, is metallized, and thus, metal wires arranged at a small pitch are prepared, and in a case where the obtained wires are fixed by a dielectric material, it is possible to obtain a wire grid polarization plate that has heat resistance and excellent polarization properties, and has durability even in a thin wire structure with a small pitch, and the present invention has been completed.

That is, the present invention relates to a polarization plate having a wire grid structure, the plate including: a transparent substrate; and an array including a plurality of grid-shaped convex portions that are arranged on the transparent substrate at a pitch of greater than or equal to 30 nm and less than or equal to 100 nm and extend in a predetermined direction, in which the convex portions include at least a reflection layer, a gap between the adjacent convex portions is filled with a dielectric material, and the array is fixed in a dielectric layer containing the dielectric material.

A gas layer extending in a predetermined direction may be provided in the dielectric material in the gap between the adjacent convex portions.

The dielectric layer may include a plurality of concave portions extending in a predetermined direction, on a surface.

Further, the polarization plate may further include: an antireflection layer.

The convex portion may further include a dielectric absorption layer.

The convex portion may have an aspect ratio of greater than or equal to 3 and less than or equal to 15.

A surface of the polarization plate on which incident light enters may be covered with a protective film containing a dielectric.

The surface of the polarization plate on which incident light enters may be covered with an organic water-repellent film.

In addition, another present invention relates to an optical apparatus, including: the polarization plate.

In addition, another present invention relates to a manufacturing method of a polarization plate having a wire grid structure, the method including: a block copolymer arranging step of allowing a block copolymer forming arrangement by self-assembling performance to be self-assembled on a reflection layer of a laminate including a transparent substrate and the reflection layer, and of forming a periodic lamellar structure; a mask forming step of forming a mask including a plurality of grid-shaped convex portions that are arranged at a pitch of greater than or equal to 30 nm and less than or equal to 100 nm and extend in a predetermined direction, by selectively removing a specific polymer block chain of the arranged block copolymer; an array forming step of forming an array including a plurality of grid-shaped convex portions that include at least a reflection layer, are arranged at a pitch of greater than or equal to 30 nm and less than or equal to 100 nm, and extend in a predetermined direction, by performing etching with the mask; and a convex portion fixing step of fixing the array including the convex portions that include at least the reflection layer, in a dielectric layer containing a dielectric material.

According to the present invention, it is possible to provide a wire grid polarization plate that has heat resistance and excellent polarization properties, and has durability even in a thin wire structure with a small pitch, and an optical apparatus including the polarization plate. Specifically, it is possible to provide a wire grid polarization plate that has a wire structure having an aspect ratio sufficient for exhibiting excellent polarization properties, and has durability even in a thin wire structure with a small pitch, and heat resistance, and an optical apparatus including the polarization plate.

DETAILED DESCRIPTION OF THE INVENTION

Hereinafter, embodiments of the present invention will be described in detail, with reference to the drawings.
[Polarization Plate]

The polarization plate of the present invention is a polarization plate, including: a transparent substrate; and an array including a plurality of grid-shaped convex portions that are arranged on the transparent substrate at a pitch of greater than or equal to 30 nm and less than or equal to 100 nm and extend in a predetermined direction, in which the convex portions include at least a reflection layer, a gap between the adjacent convex portions is filled with a dielectric material, and the array is fixed in a dielectric layer containing the dielectric material. Note that, the polarization plate of the present invention may include other layers in addition to the transparent substrate, the reflection layer, and the dielectric layer, insofar as the effects of the present invention are exhibited.

Figure 1:
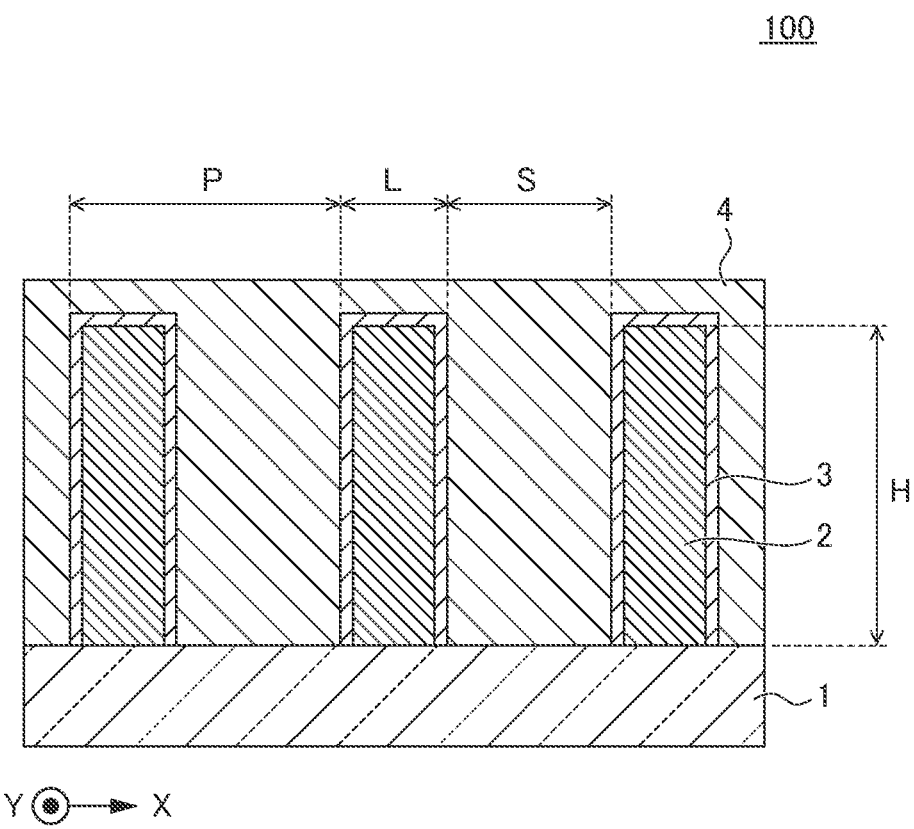
FIG. 1 is a sectional schematic view illustrating a polarization plate according to one embodiment of the present invention.

FIG. 1 is a sectional schematic view illustrating a polarization plate 100 according to one embodiment of the present invention. As illustrated in FIG. 1, the polarization plate 100 includes a transparent substrate 1 that is transparent with respect to light in a use band, and an array including a plurality of grid-shaped convex portions that extend in a predetermined direction on one surface of the transparent substrate 1 at a pitch of greater than or equal to 30 nm and less than or equal to 100 nm. The convex portions include at least a reflection layer 2, and a gap between the adjacent convex portions is filled with a dielectric material. Then, the array including the convex portions is fixed by being included in a dielectric layer 4 containing the dielectric material that fills the gap between the convex portions.

Here, as illustrated in FIG. 1, the direction in which the convex portion extends (the predetermined direction) is referred to as a Y axis direction. In addition, a direction orthogonal to the Y axis direction, in which the convex portions are arranged along a main surface of the transparent substrate 1, is referred to as an X axis direction. In this case, light that is incident on the polarization plate 100 is preferably incident from a direction orthogonal to the X axis direction and the Y axis direction, on a side where the convex portion of the transparent substrate 1 is formed.

In a polarization plate having a wire grid structure, four actions of transmission, reflection, interference, and selective light absorption of a polarization wave according to optical anisotropy are used, and thus, a polarization wave having an electric field component parallel to the Y axis direction (a TE wave (an S wave)) is attenuated, and a polarization wave having an electric field component parallel to the X axis direction (a TM wave (a P wave)) is transmitted. Accordingly, in FIG. 1, the Y axis direction is a direction of an absorption axis of the polarization plate, and the X axis direction is a direction of a transmission axis of the polarization plate.

When light L that is incident from a side where the convex portion of the polarization plate 100 illustrated in FIG. 1 is formed passes through the dielectric layer 4, a part of the light is absorbed and attenuated. In light transmitted through the dielectric layer 4, the polarization wave (the TM wave (the P wave)) is transmitted through the reflection layer 2 with a high transmittance. On the other hand, in light transmitted through the dielectric layer 4, the polarization wave (the TE wave (the S wave)) is reflected on the reflection layer 2. When the TE wave reflected on the reflection layer 2 passes through the dielectric layer 4, a part of the TE wave is absorbed, and another part of the TE wave is reflected and is returned to the reflection layer 2. The TE wave reflected on the reflection layer 2 is interfered and attenuated at the time of passing through the dielectric layer 4. As described above, the TE wave is selectively attenuated, and thus, the polarization plate 100 is capable of obtaining desired polarization properties.

As illustrated in FIG. 1, the grid-shaped convex portions in the polarization plate of the present invention at least include a reflection layer 2 when seen from the direction in which each one-dimensional grid extends (the predetermined direction), that is, in a sectional view orthogonal to the predetermined direction. There is no problem even in the case of including other layers in addition to the reflection layer, and in the polarization plate 100 illustrated in FIG. 1, the convex portions include a metal-oxide film 3 in addition to the reflection layer 2.

Herein, the dimension will be described by using FIG. 1. A height indicates a dimension in a direction perpendicular to the main surface of the transparent substrate 1 in FIG. 1. A width indicates a dimension in the X axis direction orthogonal to a height direction when seen from the Y axis direction along the direction in which the convex portions extend. In addition, when the polarization plate 100 is seen from the Y axis direction along the direction in which the convex portions extend, a repeating interval of the convex portions in the X axis direction is referred to as a pitch. Herein, in the drawings, H represents the height of the reflection layer, P represents the pitch of the convex portions, W represents a line width of the convex portion, and S represents a space width of the convex portions.

(Transparent Substrate)

The transparent substrate (the transparent substrate 1 in FIG. 1) is not particularly limited insofar as the substrate exhibits light transmissivity with respect to light in a use band, and can be suitably selected in accordance with an object. 'Exhibiting the light transmissivity with the light in the use band' does not indicate that the transmittance of the light in the use band is 100%, but it is sufficient to exhibit light transmissivity at which a function as the polarization plate can be retained. Examples of the light in the use band include visible light at a wavelength of approximately 380 nm to 810 nm.

The shape of the main surface of the transparent substrate is not particularly limited, and a shape according to an object (for example, a rectangular shape) is suitably selected. It is preferable that an average thickness of the transparent substrate, for example, is 0.3 mm to 1 mm.

A material having a refractive index of 1.1 to 2.2 is preferable as a configuration material of the transparent substrate, and examples thereof include glass, crystal, sapphire, and the like. It is preferable to use glass, in particular, quartz glass (a refractive index of 1.46) or soda-lime glass (a refractive index of 1.51), from the viewpoint of the cost and a light transmittance. A component composition of a glass material is not particularly limited, and for example, an inexpensive glass material such as silicate glass widely distributed as optical glass can be used.

In addition, it is preferable to use crystal or sapphire having high thermal conductivity, from the viewpoint of thermal conductivity. Accordingly, high light resistance is obtained with respect to strong light, and crystal or sapphire is preferably used as a polarization plate for an optical engine of a projector having a large heat release value.

Note that, in the case of using a transparent substrate containing optically active crystals such as crystal, it is preferable that the convex portions are disposed in a parallel direction or a perpendicular direction with respect to an optical axis of the crystals. Accordingly, excellent optical properties can be obtained. Here, the optical axis is a direction axis in which a difference in refractive indices between 0 (an ordinary ray) and E (an extraordinary ray) of light travelling in the direction is minimized.

(Array Including Plurality of Grid-Shaped Convex Portions)

In the polarization plate of the present invention, the array including the plurality of grid-shaped convex portions includes a plurality of grid-shaped convex portions that are arranged on the transparent substrate and extend in a predetermined direction. Specifically, the array is an array in which convex portions that are formed on one side surface of the transparent substrate and extend into the shape of a strip in the Y axis direction that is the absorption axis are arranged.

The array including the plurality of grid-shaped convex portions includes at least the reflection layer, and may include other layers or other films in addition to the reflection layer. In addition, the other layers or the other films in addition to the reflection layer are not limited to a case where the layers and the films are provided horizontally on the transparent substrate, and for example, may be formed perpendicularly. For example, in the polarization plate 100 illustrated in FIG. 1, the reflection layer 2 that is an essential layer configuring the convex portion is covered with the metal-oxide film 3.

In the wire grid polarization plate, it is preferable that the pitch of the grid-shaped convex portions is less than ½ of a use wavelength, and in a case where the pitch exceeds the range, diffraction light is generated. For this reason, in general, the pitch is less than or equal to 200 nm.

However, in the polarization plate of the present invention, the pitch of the grid-shaped convex portions (the pitch P of the convex portions in FIG. 1) is greater than or equal to 30 nm and less than or equal to 100 nm. In the wire grid polarization plate of the present invention, the pitch of the grid-shaped convex portions is small. The pitch of the convex portions is sufficiently small, and thus, in order to attain desired polarization properties, it is possible to decrease an aspect ratio of the convex portion. Note that, it is difficult to form the grid-shaped convex portions at a pitch of less than 30 nm, and in a case where the pitch is greater than 100 nm, the optical properties are degraded.

The pitch of the grid-shaped convex portions can be measured by being observed with a scanning electron microscope or a transmission electron microscope. For example, the pitch was measured at arbitrary four spots by using a scanning electron microscope or a transmission electron microscope, and an arithmetic average value thereof can be set to the pitch of the convex portions. Hereinafter, such a measurement method will be referred to as an electron microscope method.

The width of the convex portion (the line width W of the convex portion in FIG. 1) depends on a relationship with respect to the pitch, and for example, is preferably 20% to 70%, as a ratio to the pitch. Note that, the width, for example, can be measured by the electron microscope method described above.

A film thickness of the array including the plurality of grid-shaped convex portions is not particularly limited within a range in which required polarization properties can be exhibited, and for example, is preferably 110 nm to 450 nm. Note that, the film thickness of the array, for example, can be measured by the electron microscope method described above.

Note that, in the polarization plate of the present invention, the gap between the adjacent convex portions is filled with the dielectric material, and the array including the plurality of convex portions is fixed in the dielectric layer containing the dielectric material. In a case where the convex portion is embedded in the dielectric material as described above, the polarization properties decrease, and in particular, the transmittance of the polarization wave having an electric field component in a direction orthogonal to the direction in which the convex portions extend (a longitudinal direction) (the TM wave (the P wave)) decreases, and thus, contrast decreases. Therefore, in order for an embedded type wire grid polarization plate to exhibit sufficient polarization properties, it is necessary to have a sufficient height of the convex portion, that is, it is necessary to increase the film thickness of the array including the plurality of grid-shaped convex portions. As a result thereof, it is necessary to form a convex portion having a large aspect ratio, and thus, the existing manufacturing technology has reached the limit. In contrast, in the present invention, the pitch of the convex portions is small, and thus, the height of the convex portion is suppressed within a range not exceeding the manufacturing limit, and excellent polarization properties are exhibited.

It is preferable that the aspect ratio of the grid-shaped convex portion (Height of Convex Portion/Line Width of Convex Portion) is greater than or equal to 3 and less than or equal to 15. In a case where the aspect ratio is less than 3, sufficient polarization properties are not exhibited, and a case where the aspect ratio is greater than 15 is at a level difficult for in the current manufacturing technology.

(Reflection Layer)

The reflection layer (the reflection layer 2 in FIG. 1) that is an essential configuration layer of the plurality of grid-shaped convex portions is arranged on the transparent substrate, extends in the predetermined direction, and forms the plurality of grid-shaped convex portions. Specifically, the reflection layer is a metal film that is formed on one side surface of the transparent substrate and extends into the shape of a strip in the Y axis direction that is the absorption axis. Note that, in the present invention, other layers may be provided between the transparent substrate and the reflection layer.

The reflection layer contributes to the exhibition of a function as a wire grid type polarizer, attenuates the polarization wave having an electric field component in a direction parallel to the direction in which the reflection layer extends (the longitudinal direction) (the TE wave (the S wave)), and transmits the polarization wave having an electric field component in a direction orthogonal to the direction in which the reflection layer extends (the longitudinal direction) (the TM wave (the P wave)).

A configuration material of the reflection layer is not particularly limited insofar as the material has reflectivity with respect to light in a use band, and examples thereof include a single element such as Al, Pt, Ag, Cu, Mo, Cr, Ti, Ni, W, Fe, Si, Ge, and Te, or an alloy containing one or more types of the elements. Among them, in the case of using the polarization plate of the present invention in the application of visible light, it is preferable that the reflection layer contains aluminum or an aluminum alloy. Note that, in addition to such metal materials, for example, the reflection layer may contain an inorganic film or a resin film other than a metal of which the surface has a high reflectance due to coloration or the like.

A film thickness of the reflection layer (the height H of the reflection layer in FIG. 1) is not particularly limited within a range in which required polarization properties can be exhibited, but depends on the aspect ratio, and for example, is preferably 100 nm to 400 nm, and is more preferably 120 nm to 180 nm. Note that, the film thickness of the reflection layer, for example, can be measured by the electron microscope method described above.

(Metal-Oxide Film)

In the present invention, the metal-oxide film (the metal-oxide film 3 in FIG. 1) is an arbitrary layer. In the polarization plate 100 having a configuration illustrated in FIG. 1, the metal-oxide film 3 is provided in a state of covering the reflection layer 2.

A metal configuring the metal-oxide film is an oxide of the material configuring the reflection layer, and is formed as a natural oxide film. In addition, the thickness of the metal-oxide film is not particularly limited, and in general, is less than or equal to 5 nm.

(Dielectric Layer)

The dielectric layer (the dielectric layer 4 in FIG. 1) is a layer for fixing the array including the plurality of grid-shaped convex portions. The dielectric layer contains the dielectric material, and the dielectric material fills at least the gap between the adjacent convex portions. The convex portion is fixed by filling the gap between the convex portions with the dielectric material, and thus, the polarization plate of the present invention has heat resistance, and has durability even in a thin wire structure with a small pitch.

A material configuring the dielectric layer is not particularly limited, and examples thereof include a Si oxide such as $SiO_2$, $AlF_2$, $BaF_2$, $CeF_3$, $LaF_3$, LiF, $MgF_2$, $NdF_3$, NaF, $YF_3$, and the like, from the viewpoint of suppressing unnecessary reflection or the like of a ray to be polarized in the polarization plate. Among them, a substance having a refractive index of 1.30 to 1.70 is preferable, and it is more preferable that the dielectric layer contains a Si oxide such as $SiO_2$. It is possible to control the polarization properties by selecting the material of the dielectric layer.

The dielectric layer in the polarization plate of the present invention may be provided in order to fix at least the convex portions in which the gap between the adjacent convex portions is embedded, or may include the array including the plurality of grid-shaped convex portions. In the case of including the array including the plurality of convex portions, it is preferable that a height from the top of the convex portion that is fixed in the dielectric layer to the surface of the dielectric layer (for example, a height Ha from the top of the convex portion to the dielectric layer in FIG. 2) is in a range of 5 nm to 150 nm.

A film thickness of the dielectric layer from the top of the convex portion is suitably set, and thus, it is possible to return a part of the TE wave that is reflected on the reflection layer to the reflection layer, and to attenuate light. The TE wave is selectively attenuated as described above, and thus, desired polarization properties can be obtained. Note that, the thickness of the dielectric layer from the top of the convex portion, for example, can be measured by the electron microscope method described above.

(Protective Film)

In addition, in the polarization plate of the present invention, the surface on a light incidence side may be covered with a protective film containing a dielectric, within a range not affecting a change in the optical properties. The protective film includes a dielectric film.

(Organic Water-Repellent Film)

Further, in the polarization plate of the present invention, the surface on the light incidence side may be covered with an organic water-repellent film. The organic water-repellent film, for example, contains a phosphonic acid derivative such as FOPA, ODPA, and FDPA, a fluorine-based silane compound such as FDTS and FSAM, and the like. Accordingly, it is possible to improve the reliability of the polarization plate, such as moisture resistance.

Note that, the present invention is not limited to the embodiment illustrated in FIG. 1, and modifications and improvements within a range in which the object of the present invention can be attained are included in the present invention.

Figure 2:
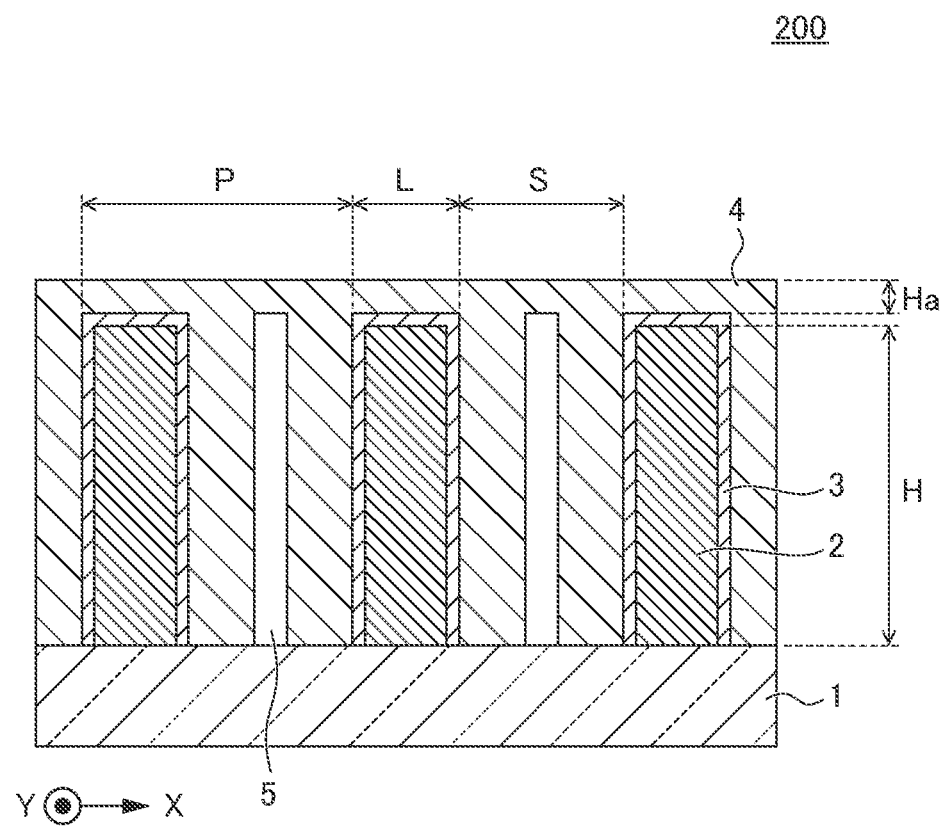
FIG. 2 is a sectional schematic view of a polarization plate according to one embodiment of the present invention.

FIG. 2 is a sectional schematic view illustrating a polarization plate 200 according to one embodiment of the present invention. The polarization plate 200 illustrated in FIG. 2 includes the transparent substrate 1, and the array including the plurality of grid-shaped convex portions that extend in the predetermined direction on one surface of the transparent substrate 1 at a pitch of greater than or equal to 30 nm and less than or equal to 100 nm. The convex portion includes the reflection layer 2 that is covered with the metal-oxide film 3, and the gap between the adjacent convex portions is filled with the dielectric material. Then, the array including the convex portions fixed by being included in the dielectric layer 4 containing the dielectric material that fills the gap between the convex portions.

In the polarization plate 200 according to one embodiment of the present invention in FIG. 2, an air layer 5 is provided in the dielectric material filling the gap between the adjacent convex portions. The air layer 5 is a layer that is arranged on the transparent substrate and forms the plurality of grid-shaped convex portions extending in the predetermined direction. In this embodiment, it is possible to improve a transmission axis transmittance and to decrease an absorption axis transmittance by providing the air layer 5. It is preferable that the width of the air layer is 3 nm to 10 nm, and the height of the air layer is approximately the same as that of the convex portion.

Figure 3:
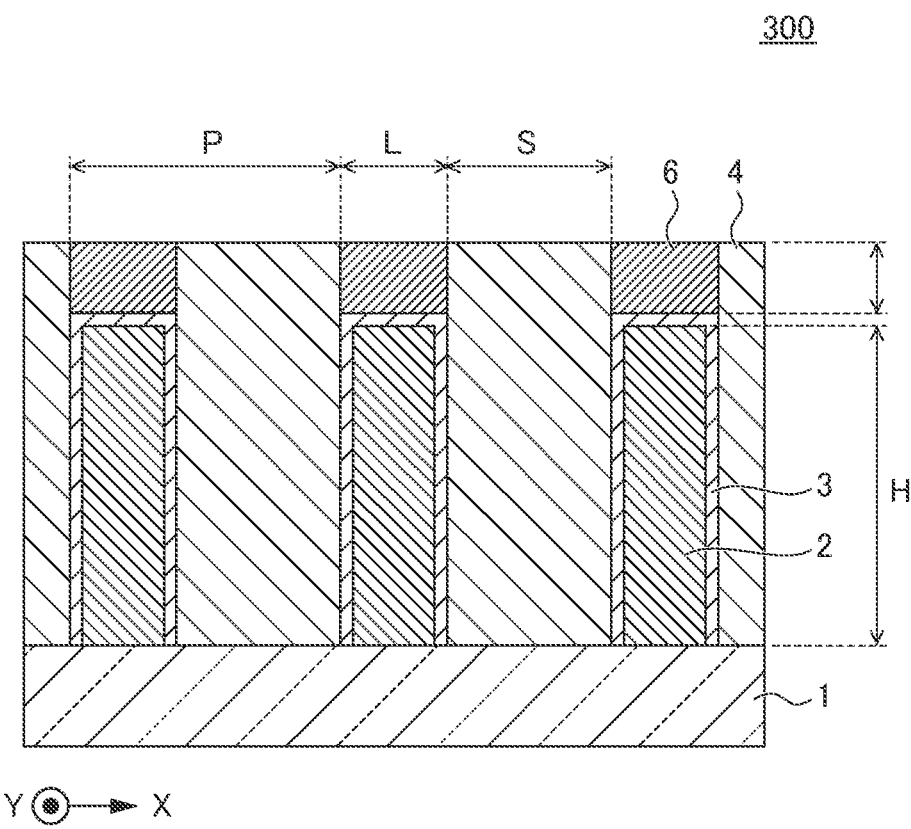
FIG. 3 is a sectional schematic view of a polarization plate according to one embodiment of the present invention.

FIG. 3 is a sectional schematic view illustrating a polarization plate 300 according to one embodiment of the present invention. The polarization plate 300 illustrated in FIG. 3 includes the transparent substrate 1, and the array including the plurality of grid-shaped convex portions that extend in the predetermined direction on one surface of the transparent substrate 1 at a pitch of greater than or equal to 30 nm and less than or equal to 100 nm.

In the polarization plate 300 in FIG. 3, a dielectric absorption layer 6 is laminated on the reflection layer 2 that is covered with the metal-oxide film 3, and the convex portion includes the reflection layer 2, the metal-oxide film 3, and the dielectric absorption layer 6. The dielectric material fills not only the reflection layer 2 and the metal-oxide film 3 in the gap between the adjacent convex portions, but also a space between the dielectric absorption layer 6, and thus, the entire height of the convex portion is fixed in the dielectric layer 4.

The dielectric absorption layer 6 configuring the convex portion of the polarization plate 300 illustrated in FIG. 3 is laminated on the reflection layer 2 that is covered with the metal-oxide film 3 to be perpendicular to a surface direction of the transparent substrate 1, and has a rectangular shape when seen from the direction in which the grid-shaped convex portions extend (the predetermined direction: the Y axis direction), that is, in a sectional view orthogonal to the predetermined direction. In addition, the width of the dielectric absorption layer 6 is approximately the same as the width of a rectangular portion in the reflection layer 2 that is positioned on a lower layer and is covered with the metal-oxide film 3.

(Dielectric Absorption Layer)

The dielectric absorption layer (the dielectric absorption layer 6 in FIG. 3) is formed on the reflection layer 2 that is covered with the metal-oxide film 3, and extends into the shape of a strip in the Y axis direction that is the absorption axis. Then, the dielectric absorption layer configures the reflection layer 2 and the metal-oxide film 3, and a part of the convex portion.

In the present invention, in a case where the dielectric absorption layer is provided, a dielectric film and an absorption film exist with a boundary, and the dielectric absorption layer may be a multi-layer film or may be an integrated layer having both dielectric properties and absorptive properties. In addition, in the case of the integrated layer having both the dielectric properties and the absorptive properties, the integrated layer may be a mixed film in which a film composition is approximately homogeneous in the layer without being changed, or may be a gradation film in which the film composition is changed in a film thickness direction.

In a case where the dielectric absorption layer 6 is the multi-layer film in which the dielectric film and the absorption film are provided separately, it is preferable that the dielectric film is provided on the reflection layer 2 that is covered with the metal-oxide film 3, and the absorption film is laminated thereon. It is more preferable that the dielectric film is provided on the reflection layer 2, the absorption film is laminated thereon, and the dielectric film is further laminated thereon.

Examples of a material configuring the dielectric film include general materials such as a Si oxide such as $SiO_2$, a metal oxide such as $Al_2O_3$, beryllium oxide, and bismuth oxide, $MgF_2$, cryolite, germanium, titanium dioxide, magnesium fluoride, boron nitride, boron oxide, tantalum oxide, hafnium oxide, or a combination thereof. Among them, it is preferable that the dielectric film contains a Si oxide.

It is preferable that a refractive index of the dielectric film is greater than 1.0 and is less than or equal to 2.5. Optical properties of the reflection layer that is provided in the lower portion of the convex portion lower portion are also affected by the surrounding refractive index, and thus, the properties of the polarization plate can be controlled by selecting the material of the dielectric film.

In addition, in the case of suitably adjusting a film thickness or the refractive index of the dielectric film, it is possible to reflect a part of the TE wave reflected on the reflection layer at the time of being transmitted through the absorption film and to return to the reflection layer, and thus, it is possible to attenuate light passing through the absorption layer by interference. The TE wave can be selectively attenuated as described above, and as a result thereof, desired polarization properties are obtained.

The film thickness of the dielectric film is set in a range in which the phase of polarized light that is transmitted through the absorption film and is reflected on the reflection layer is shifted by a half wavelength with respect to polarized light that is reflected on the absorption film. Specifically, it is preferable that the film thickness of the dielectric film is suitably set in a range of 1 nm to 500 nm in which the phase of the polarized light is adjusted, and the interference effect can be increased. Note that, the film thickness of the dielectric layer, for example, can be measured by the electron microscope method described above.

Examples of a configuration material of the absorption film include one or more types of substances in which an extinction constant of an optical constant is not zero, and a light absorption action is provided, such as a metal material or a semiconductor material, and the configuration material is suitably selected in accordance with a wavelength range of light to be applied. Examples of the metal material include a single element such as Ta, Al, Ag, Cu, Au, Mo, Cr, Ti, W, Ni, Fe, and Sn, or an alloy containing one or more types of the elements. In addition, examples of the semiconductor material include Si, Ge, Te, ZnO, and a silicide material (β-FeSi$_2$, MgSi$_2$, NiSi$_2$, BaSi$_2$, CrSi$_2$, CoSi$_2$, TaSi, and the like). By using such materials, in the polarization plate to be obtained, a high extinction ratio can be obtained with respect to a visible light range to be applied. Among them, it is preferable that the absorption film contains Fe or Ta, and contains Si.

In the case of using the semiconductor material as the absorption film, band gap energy of a semiconductor is involved in an absorption action, and thus, the band gap energy is less than a use band. For example, in the case of using visible light, absorption at a wavelength of greater than or equal to 400 nm, that is, a material of less than or equal to 3.1 ev as a band gap is used.

A film thickness of the absorption film is not particularly limited, and for example, is preferably 10 nm to 100 nm. Note that, the film thickness of the absorption layer, for example, can be measured by the electron microscope method described above.

Note that, the absorption layer can also be formed as a film having a high density by a vapor deposition method or a sputtering method. In addition, the absorption layer may include two or more layers containing different configuration materials.

Figure 4:
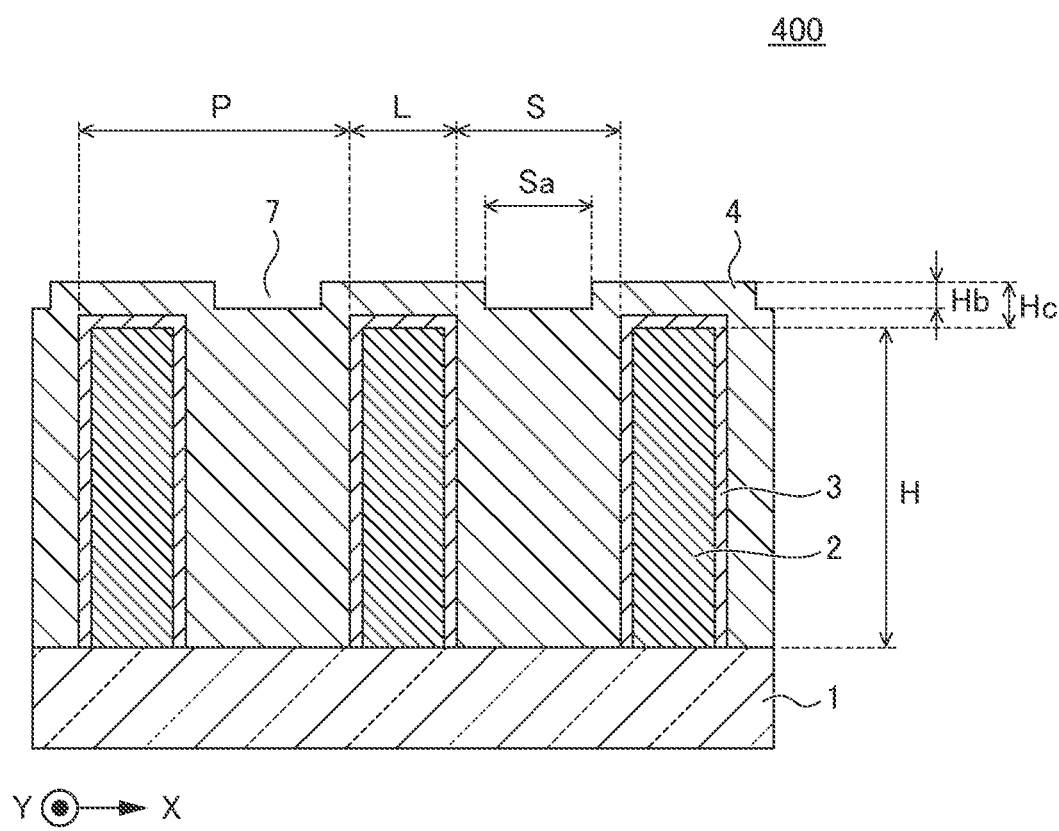
FIG. 4 is a sectional schematic view of a polarization plate according to one embodiment of the present invention.

FIG. 4 is a sectional schematic view illustrating a polarization plate 400 according to one embodiment of the present invention. The polarization plate 400 illustrated in FIG. 4 includes the transparent substrate 1, and the array including the plurality of grid-shaped convex portions that extend in the predetermined direction on one surface of the transparent substrate 1 at a pitch of greater than or equal to 30 nm and less than or equal to 100 nm. The convex portion includes the reflection layer 2 that is covered with the metal-oxide film 3, and the gap between the adjacent convex portions is filled with the dielectric material. Then, the array including the convex portions is fixed by being included in the dielectric layer 4 containing that dielectric material that fills the gap between the convex portions.

In the polarization plate 400 according to one embodiment of the present invention in FIG. 4, a plurality of concave portions 7 extending in a predetermined direction are provided on the surface of the dielectric layer 4. The concave portions 7 are formed on the surface of the dielectric layer 4, and are provided to be approximately parallel to the plurality of grid-shaped convex portions extending in the predetermined direction. In this embodiment, it is possible to improve the transmission axis transmittance and to decrease the absorption axis transmittance, by providing the concave portions 7 on the surface of the dielectric layer 4. It is preferable that the width of the concave portion is approximately the same as the width of the convex portion, and the depth is approximately 10 nm to 50 nm.

Figure 5:
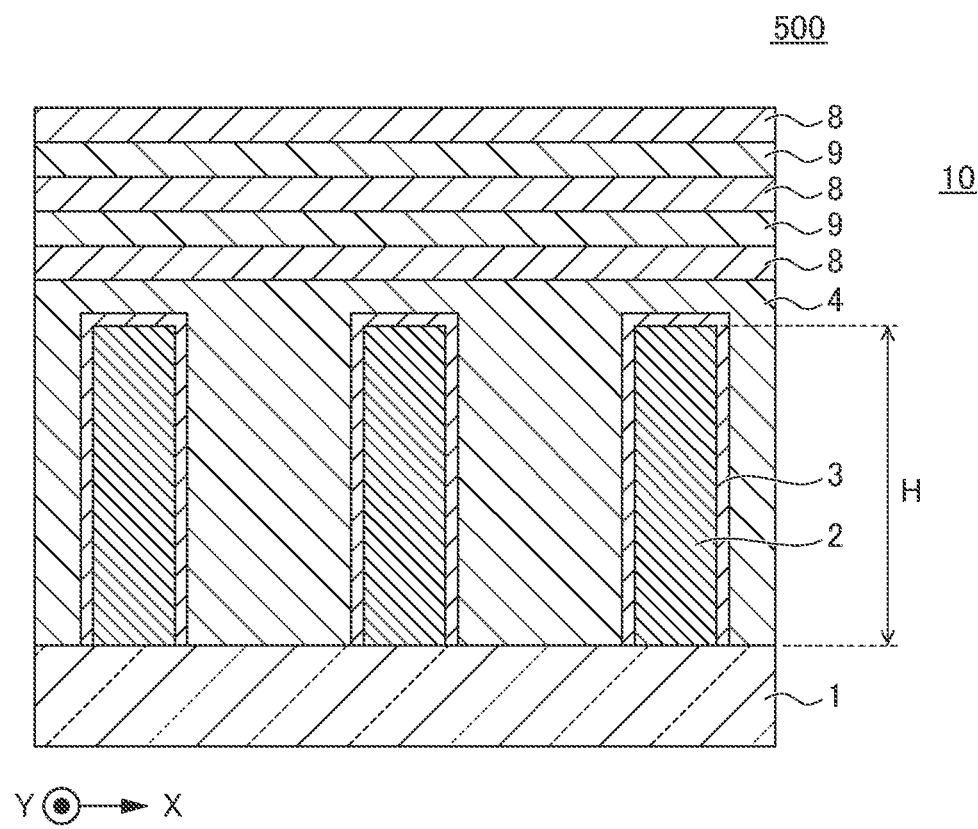
FIG. 5 is a sectional schematic view of a polarization plate according to one embodiment of the present invention.

FIG. 5 is a sectional schematic view illustrating a polarization plate 500 according to one embodiment of the present invention. The polarization plate 500 illustrated in FIG. 5 includes the transparent substrate 1, and the array including the plurality of grid-shaped convex portions that extend in the predetermined direction on one surface of the transparent substrate 1 at a pitch of greater than or equal to 30 nm and less than or equal to 100 nm. The convex portion includes the reflection layer 2 that is covered with the metal-oxide film 3, and the gap between the adjacent convex portions is filled with the dielectric material. Then, the array including the convex portions is fixed by being included in the dielectric layer 4 containing the dielectric material that fills the gap between the convex portions.

In the polarization plate 500 in FIG. 5, an antireflection layer 10 is provided on the dielectric layer 4. The antireflection layer 10 is a multi-layer film in which a low-refractive index layer 8 and a high-refractive index layer 9 are alternately laminated. In the polarization plate 500 in FIG. 5, the antireflection layer 10 includes three low-refractive index layers 8 and two high-refractive index layers 9. However, the number of layers configuring the antireflection layer 10 is not particularly limited, and the antireflection layer can be configured to have layers and a thickness not affecting desired polarization properties. In this embodiment, it is possible to suppress the reflection of incident light and to improve the optical properties, by providing the antireflection layer 10 on the surface of the dielectric layer 4.

A material configuring the low-refractive index layer is not particularly limited insofar as the material has a refractive index less than that of a material configuring the high-refractive index layer, and examples thereof include SiO$_2$, AlF$_2$, BaF$_2$, CeF$_3$, LaF$_3$, LiF$_3$, LiF, MgF$_2$, NdF$_3$, NaF, YF$_3$, and the like.

The material configuring the high-refractive index layer is not particularly limited insofar as the material has a refractive index greater than that of the low-refractive index layer, and examples thereof include Al$_2$O$_3$, CeO$_2$, Cr$_2$O$_3$, HfO$_3$, In$_2$O$_3$, La$_2$O$_3$, MgO, Nb$_2$O$_5$, Nd$_2$O$_3$, Sb$_2$O$_3$, SnO$_2$, TiO$_2$, TiO, Ti$_2$O$_3$, Ta$_2$O$_5$, WO$_3$, Y$_2$O$_3$, ZrO$_2$, ZnO, ZnS, and the like.

[Manufacturing Method of Polarization Plate]

The polarization plate of the present invention is manufactured by using a material forming arrangement by self-assembling performance, in order to attain a small pitch. A periodic lamellar structure is formed by performing self-assembling, grid-shaped convex portions with a small pitch are prepared, and then, an array including the obtained plurality of convex portions is fixed by a dielectric material.

Examples of the material forming the arrangement by the self-assembling performance arrange include a block copolymer. In order to obtain the polarization plate of the present invention, for example, it is preferable to use a block copolymer having a molecular chain containing a polymethacrylic acid and a molecular chain containing polystyrene. The block copolymer having a molecular chain containing a polymethacrylic acid and a molecular chain containing polystyrene is phase-separated to a structure having a regular domain such as lamellar, and forms a periodic pattern. According to the design of the block copolymer, it is possible to adjust the shape or the dimension of the domain, and it is also possible to attain a pattern according to a nanoscale periodic lamellar structure.

That is, a method for manufacturing the polarization plate of the present invention, includes at least: a block copolymer arranging step of allowing a block copolymer forming arrangement by self-assembling performance to be self-assembled on a reflection layer of a laminate including a transparent substrate and a reflection layer, and of forming a periodic lamellar structure; a mask forming step of forming a mask including a plurality of grid-shaped convex portions that are arranged at a pitch of greater than or equal to 30 nm and less than or equal to 100 nm and extend in a predetermined direction, by selectively removing a specific polymer block chain of the arranged block copolymer; an array forming step of forming an array including a plurality of grid-shaped convex portions that include at least a reflection layer, are arranged at a pitch of greater than or equal to 30 nm and less than or equal to 100 nm, and extend in a predetermined direction, by performing etching with the mask that is formed in the mask forming step; and a convex portion fixing step of fixing the array including the convex portions that include at least the reflection layer, in a dielectric layer containing a dielectric material. Other steps in addition to the steps described above may be included.

Note that, in the present invention, the steps are essential for attaining a small pitch, and other steps in addition to the steps described above may be included. For example, in order to facilitate the arrangement of the block copolymer, a step of preparing a guide pattern, a step of preparing a pattern of a neutral layer having affinity with respect to the specific polymer block chain, or the like may be provided before the block copolymer arranging step.

(Block Copolymer Arranging Step)

In the block copolymer arranging step, the block copolymer forming the arrangement by the self-assembling performance is self-assembled on the reflection layer of the laminate including the transparent substrate and the reflection layer, and thus, periodic lamellar structure is formed at a pitch of greater than or equal to 30 nm and less than or equal to 100 nm.

{Block Copolymer}

In the present invention, the block copolymer that is used for attaining a small pitch is a block copolymer forming arrangement by self-assembling performance. The block copolymer is not particularly limited insofar as the block copolymer is self-assembled. The block copolymer may have two types of polymer block chains, or may have three or more types of polymer block chains, and a block copolymer having two types of polymer block chains is preferable. In a diblock copolymer, a volume fraction of each of the polymer block chains is approximately 50%.

Examples of a preferred diblock copolymer include a block copolymer having a molecular chain containing polymethyl methacrylate and a molecular chain containing polystyrene, a block copolymer having a molecular chain containing polyethyl methacrylate and a molecular chain containing polystyrene, a block copolymer having a molecular chain containing poly(t-butyl methacrylate) and a molecular chain containing polystyrene, a block copolymer having a molecular chain containing polymethyl acrylate and a molecular chain containing polystyrene, a block copolymer having a molecular chain containing polyethyl acrylate and a molecular chain containing polystyrene, a block copolymer having a molecular chain containing poly(t-butyl acrylate) and a molecular chain containing polystyrene, a block copolymer having a molecular chain containing polybutadiene and a molecular chain containing polystyrene, a block copolymer having a molecular chain containing polyisoprene and a molecular chain containing polystyrene, and the like. Among them, the block copolymer (PMMA-b-PS) having a molecular chain containing polymethyl methacrylate (PMMA) and molecular chain containing polystyrene (PS) is preferable.

The block copolymer (PMMA-b-PS) having a molecular chain containing polymethyl methacrylate (PMMA) and a molecular chain containing polystyrene (PS) is phase-separated to a structure having a regular domain such as lamellar, and forms a periodic pattern. According to the design of the block copolymer, it is possible to adjust the shape or the dimension of the domain, and it is also possible to attain a pattern according to a nanoscale periodic lamellar structure.

In addition, polymethyl methacrylate (PMMA) has a repeating unit having a carbonyl group, and thus, a metal oxide precursor such as titanium chloride ($TiCl_4$), aluminum chloride (AlCl), and trimethyl aluminum ($Al(CH_3)_3$) is bonded to the carbonyl group, and the bonding portion is oxidized to be a metal oxide, and therefore, it is also possible to obtain a mask having high etching resistance.

Examples of a method for performing self-assembling include a heat treatment. A treatment condition in the present invention is not particularly limited insofar as the block copolymer is arranged and the lamellar structure is formed, and it is preferable that the treatment is performed at a temperature higher than a glass transition temperature or a melting temperature of the block copolymer, in which the block copolymer is not thermally decomposed. In the case of PMMA-b-PS, for example, the heat treatment is implemented at 70° C. to 130° C. for approximately 0.1 hours to 24 hours.

In addition, as described above, in order to facilitate the arrangement of the block copolymer, the step of preparing the guide pattern, the step of preparing the pattern of the neutral layer having affinity with respect to the specific polymer block chain, or the like may be provided before the block copolymer arranging step.

(Mask Forming Step)

In the mask forming step, the mask including the plurality of grid-shaped convex portions that are arranged at a pitch of greater than or equal to 30 nm and less than or equal to 100 nm and extend in the predetermined direction is formed by selectively removing the specific polymer block chain of the block copolymer that is arranged in the block copolymer arranging step.

In the block copolymer that is arranged on the reflection layer of the laminate including the transparent substrate and the reflection layer such that the periodic lamellar structure is formed by the self-assembling performance, the region of any of the polymer block chains is selectively removed, and thus, the regions of the remaining polymer block chains remain as a mask in the shape of the plurality of grid-shaped convex portions that are arranged at a pitch of greater than or equal to 30 nm and less than or equal to 100 nm and extend in the predetermined direction.

For example, in the case of using the block copolymer (PMMA-b-PS) having a molecular chain containing polymethyl methacrylate (PMMA) and a molecular chain containing polystyrene (PS), a region having a molecular chain containing polymethyl methacrylate (PMMA) can be removed with oxygen plasma etching by using a difference in etching rates. Accordingly, the region having a molecular chain containing polystyrene (PS) is capable of remaining as a mask in a line and space shape, at a pitch of greater than or equal to 30 nm and less than or equal to 100 nm.

In addition, as another example of using the block copolymer (PMMA-b-PS) having a molecular chain containing polymethyl methacrylate (PMMA) and a molecular chain containing polystyrene (PS), as described above, the metal oxide precursor such as trimethyl aluminum ($Al(CH_3)_3$), titanium chloride ($TiCl_4$), and aluminum chloride (AlCl) is bonded to the carbonyl group of the polymethyl methacrylate (PMMA), and the bonding portion is oxidized to be the metal oxide, and thus, it is also possible to obtain the mask having high etching resistance.

In the case of using trimethyl aluminum ($Al(CH_3)_3$) as the metal oxide precursor, a final metal oxide is aluminum oxide ($Al_2O_3$), and in the case of using titanium chloride ($TiCl_4$) as the metal oxide precursor, the final metal oxide is titanium oxide ($TiO_2$).

As described above, in a case where the region having a molecular chain containing polymethyl methacrylate (PMMA) is converted into the metal oxide, the region converted into the metal oxide remains as a mask, and the region having a molecular chain containing polystyrene (PS) is removed by chemicals, plasma etching, or the like. Accordingly, it is possible to use the metal oxide as a mask, and thus, it is possible to attain a polarization plate that includes convex portions having a high aspect ratio, due to high etching selectivity.

(Array Forming Step)

In the array forming step, the etching is performed by using the mask that is formed in the mask forming step, and thus, the array including the plurality of grid-shaped convex portions that include at least the reflection layer, are arranged at a pitch of greater than or equal to 30 nm and less than or equal to 100 nm, and extend in the predetermined direction is formed.

An etching method is not particularly limited, and can be suitably selected on the basis of a mask material and an etching target. Note that, the shape of the convex portion that is formed by etching greatly affects the polarization properties of the polarization plate to be obtained.

(Convex Portion Fixing Step)

In the convex portion fixing step, the array that is formed in the array forming step and includes the convex portions including at least the reflection layer is fixed in the dielectric layer containing the dielectric material.

In the polarization plate of the present invention, the gap between the adjacent convex portions is filled with the dielectric material, and thus, the plurality of grid-shaped convex portions that extend in the predetermined direction are fixed in the dielectric layer containing the dielectric material. A fixing method is not particularly limited, and examples thereof include a wet sol-gel method, a sputtering method or a vapor deposition method that is a physical film formation method, a CVD method or an ALD method that is a chemical film formation method, and the like, by using the dielectric material described above. Among them, the CVD method or the ALD method that is a chemical film formation method in which a film can be formed even on a grid side wall is preferable, and in particular, according to the ALD method, it is possible to embed the dielectric material without any gap (void).

(Protective Film Applying Step)

The manufacturing method of the polarization plate of the present invention may include a protective film applying step of covering a surface on a light incidence side with a protective film containing a dielectric. For example, the protective film can be formed on the surface of the polarization plate (a surface on which a wire grid is formed) by using chemical vapor deposition (CVD) or atomic layer deposition (ALD).

(Organic Water-Repellent Film Applying Step)

Further, the manufacturing method of the polarization plate of the present invention may include an organic water-repellent film applying step of covering the surface on the light incidence side with an organic water-repellent film. The organic water-repellent film, for example, can be formed by using CVD or ALD described above.

[Example of Self-Assembling Using Neutral Layer]

In FIGS. 6A to 6L, an aspect is illustrated in which the block copolymer (PMMA-b-PS) having a molecular chain containing polymethyl methacrylate (PMMA) and having a molecular chain containing polystyrene (PS) is self-assembled by using the neutral layer, and thus, the periodic lamellar structure is formed. In processes illustrated in FIGS. 6A to 6L, the neutral layer having affinity with respect to the specific polymer block chain is used, but as described above, the step of using the neutral layer or the guide pattern is implemented in order to facilitate the arrangement of the block copolymer, and is an arbitrary step in the present invention.

Figure 6A:
FIGS. 6A to 6L are step schematic views for manufacturing the polarization plate of the present invention.
Figure 6B:
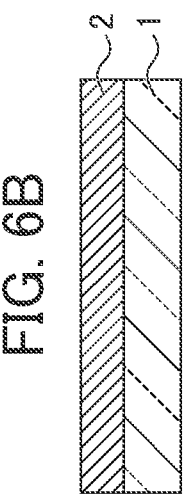

As illustrated in FIG. 6A, first, the transparent substrate 1 is prepared. Subsequently, as illustrated in FIG. 6B, the reflection layer 2 is formed on the transparent substrate 1, and thus, the laminate including the transparent substrate 1 and the reflection layer 2 is configured. In the aspect illustrated in FIGS. 6A to 6L, the transparent substrate 1 is glass, crystal, sapphire, or the like, and the reflection layer 2 is aluminum.

Figure 6C:
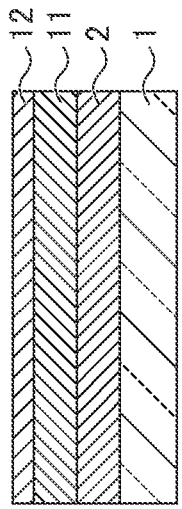

Subsequently, as illustrated in FIG. 6C, a layer of spin on carbon (SoC) 11 is formed on the reflection layer 2 by applying and drying an SoC material, and then, a layer of spin on glass (SoG) or silicon-containing anti-reflective coating (SiARC) 12 is laminated by applying and drying an SoG material or a SiARC material. The layer of SoC 11 and the layer of SoG or SiARC 12 are an antireflection layer that suppresses the reflection of exposure light in a photolithography treatment described below. Here, SoC is a spin on carbon material, SoG is a spin on glass material, and SiARC is an organic material containing silicon.

Figure 6D:
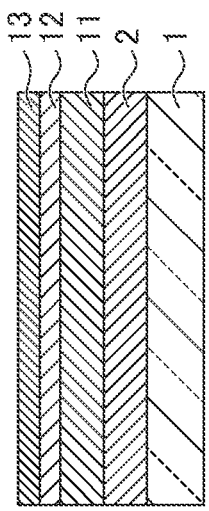
Figure 6E:
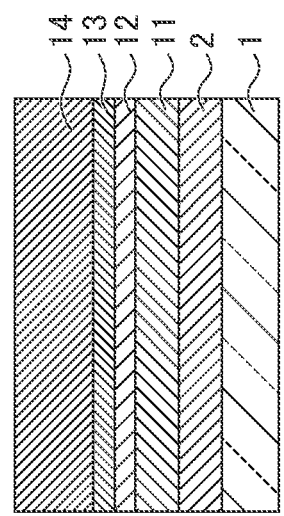

Subsequently, as illustrated in FIG. 6D, a first neutral layer 13 is formed on the formed antireflection layer. Further, as illustrated in FIG. 6E, a photoresist is applied onto the first neutral layer 12 and is dried, and thus, a layer of a resist 14 is laminated. A photoresist composition is not particularly limited, and may be a positive photoresist composition, or may be a negative photoresist composition.

Here, examples of the material of the first neutral layer include a random copolymer having affinity with respect to each of the polymer block chains of the block copolymer having self-assembling performance. Therefore, in the case of using the block copolymer (PMMA-b-PS) having a molecular chain containing polymethyl methacrylate (PMMA) and a molecular chain containing polystyrene (PS), a random copolymer (PS-r-PMMA) of polymethyl methacrylate (PMMA) and polystyrene (PS) is used as the material of the first neutral layer 13.

Figure 6F:
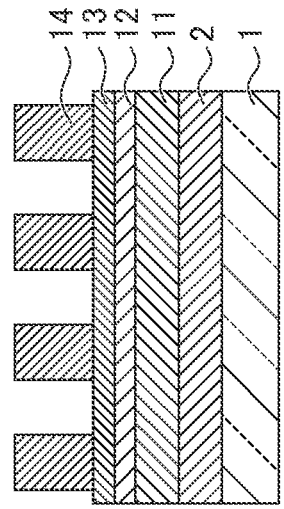

Next, as illustrated in FIG. 6F, the resist 14 is exposed and developed, and thus, a photoresist pattern in a line and space shape with a predetermined pitch interval is formed. It is preferable that the pitch of the photoresist pattern is a cycle of greater than or equal to 100 nm, and is integer multiple of the pitch of the plurality of grid-shaped convex portions in the final polarization plate such that the block copolymer can be aligned. Note that, the pitch can be measured by the electron microscope method described above.

An exposure method of the resist 14 is not particularly limited, and may be a method with a photomask, or may be a method without a photomask. Among them, an interference exposure method is preferable since the method is suitable for forming a pattern having a comparatively large area. In addition, a developing method of the resist 14 is not particularly limited, and a known developer such as an alkali developer can be used. Note that, a rinsing treatment may be performed with water or the like, after the developing.

Figure 6G:
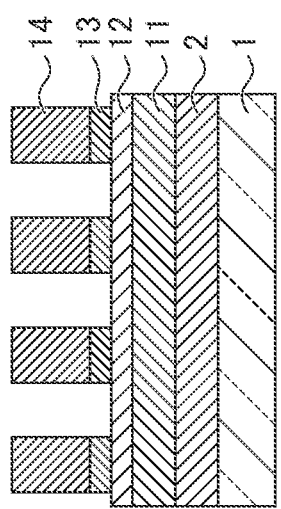

Next, as illustrated in FIG. 6G, the first neutral layer 13 is etched by using the pattern of the resist 13 as a mask, and thus, a pattern in a line and space shape with a predetermined pitch interval is formed. In the etching of the first neutral layer 12 containing the random copolymer (PS-r-PMMA) containing polymethyl methacrylate (PMMA) and polystyrene (PS), oxygen plasma is used.

Figure 6H:
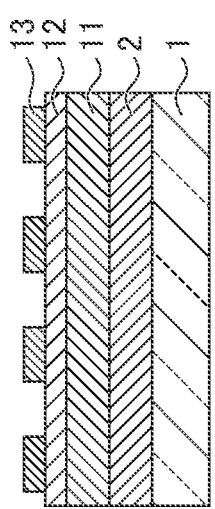

Next, as illustrated in FIG. 6H, the resist 14 is removed. The resist 14 is removed, and thus, the guide pattern of the first neutral layer 13 in a line and space shape with a predetermined pitch interval is provided on the layer of SoG or SiARC 12.

A method of removing the resist 14 is not particularly limited, and examples thereof include a method of dipping the resist in a known resist peeling liquid. At this time, an ultrasound wave may be applied in order to facilitate the removal.

Figure 6I:
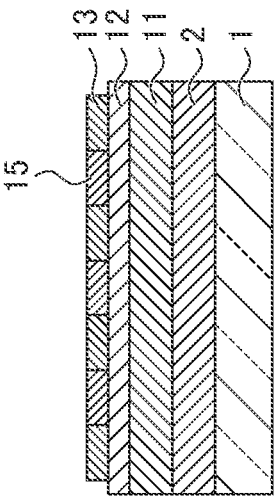

Next, as illustrated in FIG. 6I, the material of a second neutral layer 15 is applied onto the laminate including the guide pattern of the first neutral layer 12 and is dried, and thus, the second neutral layer 15 is formed in a state of being where the second neutral layer 15 is embedded in the gap of the guide pattern of the first neutral layer 13. Therefore, the first neutral layer 12 and the second neutral layer 15, disposed in the shape of a line with a predetermined interval, are alternately adjacent to each other, on the layer of SoG or SiARC 12.

Here, in the case of using the block copolymer (PMMA-b-PS) having a molecular chain containing polymethyl methacrylate (PMMA) and a molecular chain containing polystyrene (PS), as the block copolymer having self-assembling performance, a polymer having affinity with respect to the polystyrene block chain is used as the material of the second neutral layer. For example, it is possible to use polystyrene, a block copolymer, a random copolymer having a high composition ratio of polystyrene, or the like.

Next, the block copolymer (PMMA-b-PS) having a molecular chain containing polymethyl methacrylate (PMMA) and a molecular chain containing polystyrene (PS), as the block copolymer having self-assembling performance, is applied onto a surface on which the first neutral layer 12 and the second neutral layer 14 are alternately disposed in the shape of a line, and thus, a layer containing the block copolymer is formed.

Next, the layer containing the block copolymer is subjected to a heat treatment, and thus, the periodic lamellar structure in which a lamellar interface is oriented in a direction perpendicular to the transparent substrate 1 is formed by the self-assembling of the block copolymer. Specifically, as illustrated in FIG. 6J, the block copolymer (PMMA-b-PS) having a molecular chain containing polymethyl methacrylate (PMMA) and a molecular chain containing polystyrene (PS) is phase-separated in a region 16 having a molecular chain containing polymethyl methacrylate (PMMA) and a region 16 having a molecular chain containing polystyrene, and the block copolymer arranging step of the present invention is completed.

Figure 6J:
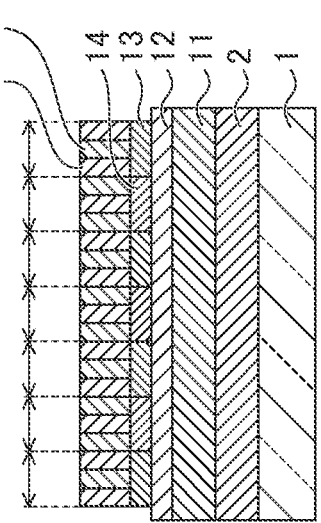

In the aspect illustrated in FIG. 6J, two lines of the region 16 having a molecular chain containing polymethyl methacrylate (PMMA) and one line of the region 16 having a molecular chain containing polystyrene are disposed on the first neutral layer 12 and one line of the region 16 having a molecular chain containing polymethyl methacrylate (PMMA) and two lines of the region 16 having a molecular chain containing polystyrene are disposed on the second neutral layer 15. That is, three lines are disposed at a pitch of greater than or equal to 30 nm and less than or equal to 100 nm on the guide pattern of each of the first neutral layer 12 and the second neutral layer 15.

After that, it is possible to finally obtain the polarization plate of the present invention by implementing the mask forming step, the array forming step, and the convex portion fixing step that are an essential step of the present invention.

Specifically, in the mask forming step, any one of the polymer block chains in the region 16 having a molecular chain containing polymethyl methacrylate (PMMA) and the region 16 having a molecular chain containing polystyrene of the periodic lamellar structure that is prepared in the block copolymer arranging step described above is selectively removed, and thus, the mask including the plurality of grid-shaped convex portions that are arranged at a pitch of greater than or equal to 30 nm and less than or equal to 100 nm and extend in the predetermined direction is formed.

Figure 6K:
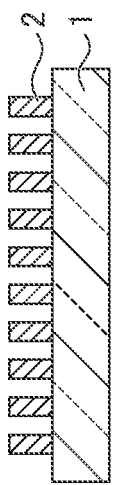

Next, in the array forming step, etching is performed by using the mask that is formed in the mask forming step and includes the region 16 having a molecular chain containing polymethyl methacrylate (PMMA) and the region 16 having a molecular chain containing polystyrene, and thus, as illustrated in FIG. 6K, the array including the plurality of grid-shaped convex portions that include the reflection layer 2, are arranged at a pitch of greater than or equal to 30 nm and less than or equal to 100 nm, and extend in the predetermined direction is formed.

Figure 6L:
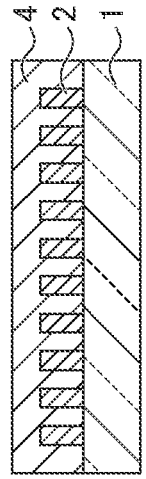

Finally, in the convex portion fixing step, as illustrated in FIG. 6L, the array of the reflection layer 2, including the plurality of grid-shaped convex portions that are arranged at a pitch of greater than or equal to 30 nm and less than or equal to 100 nm and extend in the predetermined direction, is fixed in the dielectric layer 4 containing the dielectric material.

[Optical Apparatus]

An optical apparatus of the present invention, includes: the polarization plate according to the present invention described above. Examples of the optical apparatus include a liquid crystal projector, a head-up display, a digital camera, and the like. The polarization plate according to the present invention has heat resistance and excellent polarization properties, and has durability even in a thin wire structure with a small pitch, and thus, can be used in various applications. In addition, the polarization plate according to the present invention is an inorganic polarization plate excellent in the heat resistance, compared to an organic polarization plate containing an organic material, and thus, is particularly preferable in an application in which heat resistance is required, such as a liquid crystal projector or a head-up display.

In a case where the optical apparatus according to the present invention includes a plurality of polarization plates, at least one of the plurality of polarization plates may be the polarization plate according to the present invention. For example, in a case where the optical apparatus according to this embodiment is a liquid crystal projector, at least one of polarization plates to be disposed on an incidence side and an existing side of a liquid crystal panel may be the polarization plate according to the present invention.

EXAMPLES

Next, examples of the present invention will be described, but the present invention is not limited to the examples.

[Simulation Method]

In Examples 1 to 5, optical properties of a polarization plate were verified by an electromagnetical-field simulation according to a rigorous coupled wave analysis (RCWA) method. In the simulation, a Grating Simulator Gsolver V5.1, manufactured by Grating Solver Development Co., was used.

In the verification of a relationship between a wavelength and an absorption axis transmittance, a transmittance was verified when a polarization wave having an electric field component in a direction parallel to a direction in which grid-shaped convex portions extended (a longitudinal direction) (a TE wave (an S wave)) was incident. In addition, in the verification of the relationship between the wavelength and the absorption axis reflectance, a reflectance was verified when the polarization wave having the electric field component in the direction parallel to the direction in which the grid-shaped convex portions extended (the longitudinal direction) (the TE wave (the S wave)) was incident at an incident angle of 5°. In the verification of a relationship between a wavelength and a transmission axis transmittance or a transmission axis reflectance, a transmittance or a reflectance was verified when a polarization wave having an electric field component in a direction orthogonal to a direction in which grid-shaped convex portions extended (a longitudinal direction) (a TM wave (a P wave)) was incident.

Example 1

The polarization plate 100 having the structure illustrated in FIG. 1 was subjected to the simulation by changing the pitch P of the convex portions, the line width W of the convex portion, the height of the convex portion, and a transmission axis transmittance (a P polarization transmittance) and an absorption axis transmittance (an S polarization transmittance) in a blue band (Wavelength $\lambda$=430 nm to 510 nm), a green band (Wavelength $\lambda$=520 nm to 590 nm), and a red band (Wavelength $\lambda$=600 nm to 680 nm) were obtained. Results are shown in Table 1.

The simulation was performed in a condition where the transparent substrate 1 was alkali-free glass having a thickness of 0.7 mm, the material of the reflection layer 2 was aluminum, the metal-oxide film 3 was aluminum oxide, and the dielectric material of the dielectric layer 4 for fixing the convex portion was $SiO_2$. Note that, the thickness of the metal-oxide film 3 covering the reflection layer 2 was 5 nm.

Figure 7:
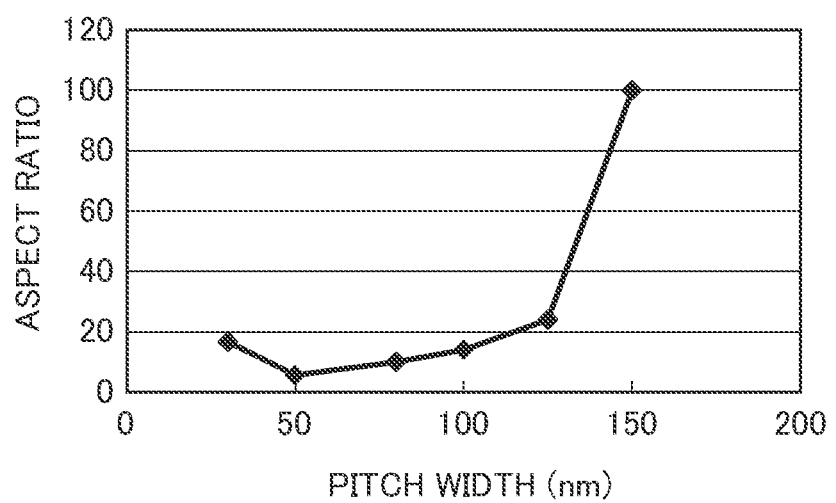
FIG. 7 is a graph illustrating a relationship between a pitch and an aspect ratio.
Figure 8:
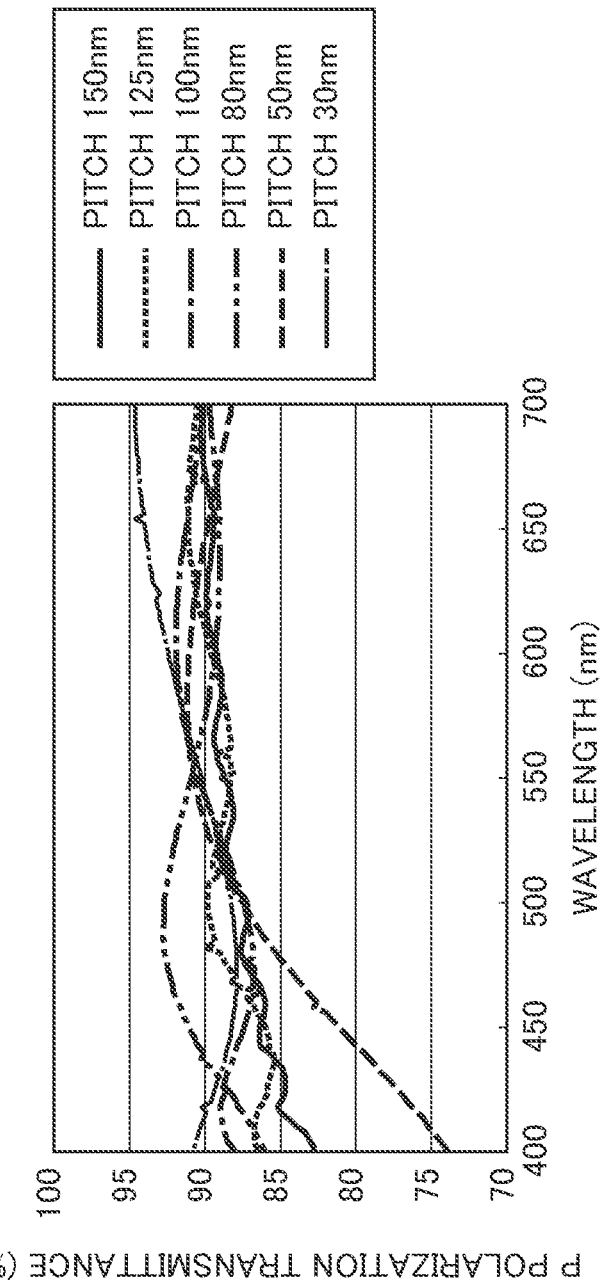
FIG. 8 is a graph illustrating relationship between a wavelength and a transmission axis transmittance.
Figure 9:
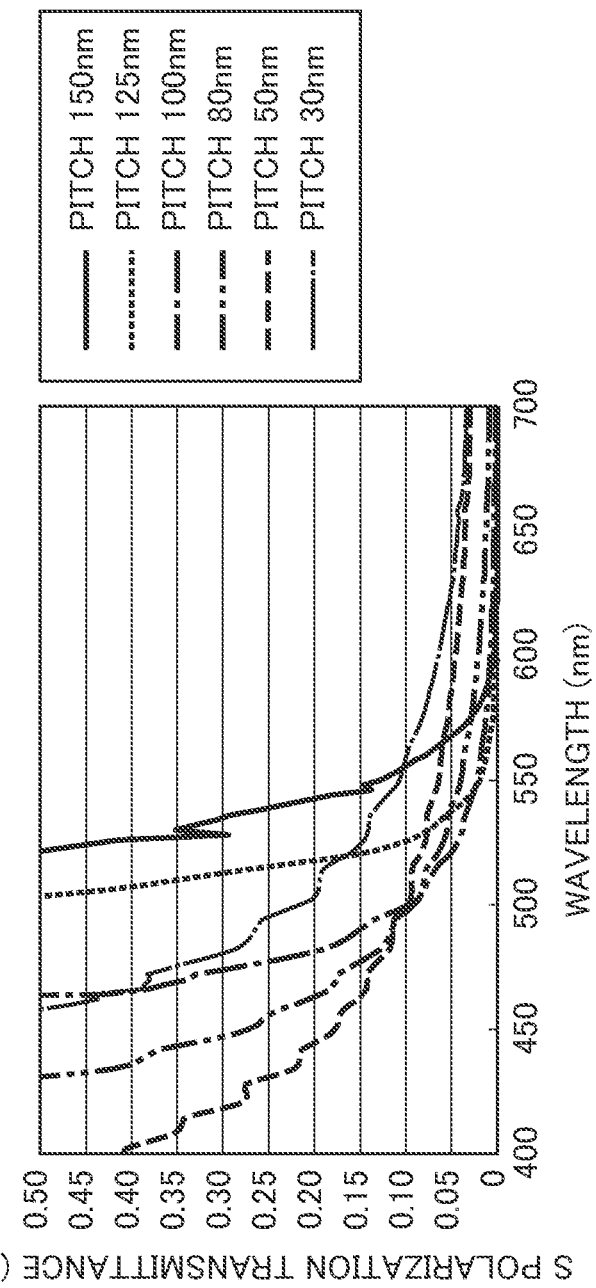
FIG. 9 is a graph illustrating a relationship between a wavelength and an absorption axis transmittance.

In general polarization properties of a commercially available wire grid polarization plate, the transmission axis transmittance is greater than or equal to 88%, and the absorption axis transmittance is less than or equal to 0.3%, in the green band (Wavelength $\lambda$=520 nm to 590 nm). Therefore, simulation results shown in Table 1 satisfy the performance of the existing commercially available product. In the polarization plate satisfying the performance of the existing commercially available product that is obtained in the simulation, a relationship between a pitch width and an aspect ratio is illustrated in FIG. 7. In addition, a relationship between a wavelength and a transmission axis transmittance (a P polarization transmittance) is illustrated in FIG. 8, and a relationship between a wavelength and an absorption axis transmittance (an S polarization transmittance) is illustrated in FIG. 9.

From Table 1 and FIG. 7 it is determined that the pitch width of the convex portions in which the manufacturing can be attained is in a range of 30 nm to 100 nm, from the viewpoint of exhibiting polarization properties equivalent to those of the existing commercially available product and of the aspect ratio. In addition, in the setting of Example 1, it is determined that the aspect ratio is minimized when the pitch width is 50 nm.

TABLE 1

| Convex structure | | | | | Transmission axis transmittance (%) | | | Absorption axis transmittance (%) | | |
|---|---|---|---|---|---|---|---|---|---|---|
| Pitch width (nm) | Line width (nm) | Height of convex portion (nm) | Aspect ratio | Thickness of dielectric layer on convex portion (nm) | $\lambda$= 430~510 nm | $\lambda$= 520~590 nm | $\lambda$= 600~680 nm | $\lambda$= 430~510 nm | $\lambda$= 520~590 nm | $\lambda$= 600~680 nm |
| 150 | 20 | 2000 | 100 | 10 | 86.7 | 88.8 | 89.7 | 3.074 | 0.158 | 0.001 |
| 125 | 25 | 600 | 24 | 10 | 87.7 | 88.6 | 90.7 | 5.478 | 0.032 | 0.001 |
| 100 | 25 | 350 | 14 | 10 | 87.3 | 90.5 | 91.4 | 0.693 | 0.024 | 0.004 |
| 80 | 25 | 250 | 10 | 10 | 91.8 | 90.8 | 89.2 | 0.216 | 0.040 | 0.014 |
| 50 | 25 | 140 | 5.6 | 10 | 83.6 | 90.7 | 90.1 | 0.152 | 0.064 | 0.037 |
| 30 | 15 | 250 | 16.7 | 10 | 88.2 | 90.5 | 93.7 | 0.454 | 0.109 | 0.047 |

Reference Example

In commercially available wire grid polarization plate A, polarization plate B, and polarization plate C, the pitch width, the line width, and the height of the convex portion were measured, and the aspect ratio of the convex portion (Grid Height/Grid Width) was obtained. Results are shown in Table 2. It is determined that in the commercially available wire grid polarization plate, the aspect ratio of the convex portion is in a range of 4 to 6, from manufacturing difficulty.

TABLE 2

| | Pitch width (nm) | Line width (nm) | Height of convex portion (nm) | Aspect ratio |
|---|---|---|---|---|
| Polarization plate A | 144 | 46 | 253 | 5.5 |
| Polarization plate B | 150 | 50 | 215 | 4.3 |
| Polarization plate C | 141 | 50 | 290 | 5.8 |

Example 2

The polarization plate 100 having a structure illustrated in FIG. 1 was subjected to the simulation by fixing the pitch P of the convex portions to 50 nm, and by changing the line width W and the height of the convex portion, and a transmission axis transmittance (a P polarization transmittance) and an absorption axis transmittance (an S polarization transmittance) in a blue band (Wavelength $\lambda$=430 nm to 510 nm), a green band (Wavelength $\lambda$=520 nm to 590 nm), a red band (Wavelength $\lambda$=600 nm to 680 nm) were obtained. Results are shown in Table 3. In addition, a relationship between an aspect ratio and an absorption axis transmittance (an S polarization transmittance) in a green band (Wavelength λ=520 nm to 590 nm) is illustrated in FIG. 10.

Note that, as with Example 1, the simulation was performed in a condition where the transparent substrate 1 was alkali-free glass having a thickness of 0.7 mm, the material of the reflection layer 2 was aluminum, the metal-oxide film 3 was aluminum oxide, and the dielectric material of the dielectric layer 4 for fixing the convex portion was $SiO_2$. Note that, the thickness of the metal-oxide film 3 covering the reflection layer 2 was 5 nm.

Figure 10:
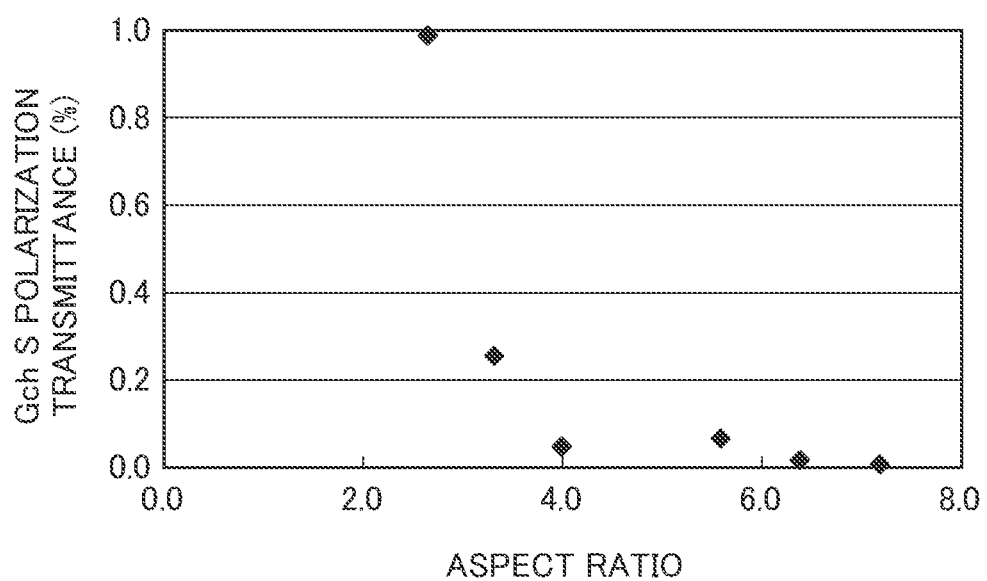
FIG. 10 is a graph illustrating a relationship between an aspect ratio and an absorption axis transmittance.

From Table 3 and FIG. 10, it is determined that it is necessary that the aspect ratio of the convex portion is greater than or equal to 3, in order to attain the transmission axis transmittance of greater than or equal to 88% and the absorption axis transmittance of less than or equal to 0.3% in the green band (Wavelength λ=520 nm to 590 nm), which are polarization properties equivalent to those of the existing commercially available product.

thickness of the absorption layer 22 was 25 nm. Therefore, the aspect ratio of the convex portion is 6.

Figure 12A:
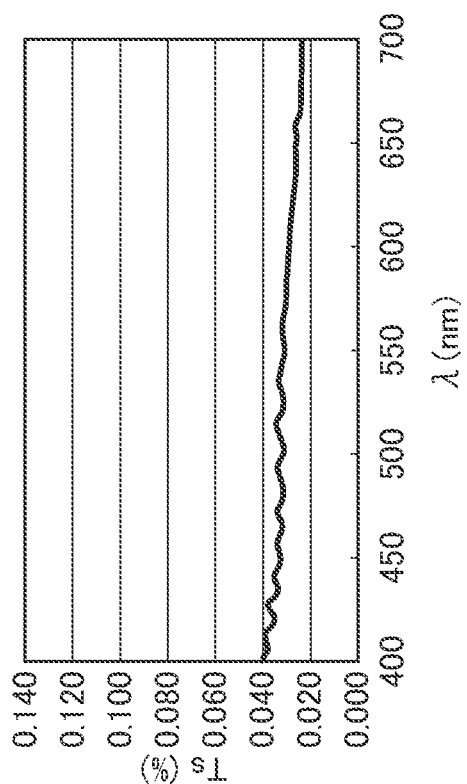
FIGS. 12A to 12D are graphs illustrating a relationship between a wavelength and a transmittance or a reflectance.
Figure 12B:
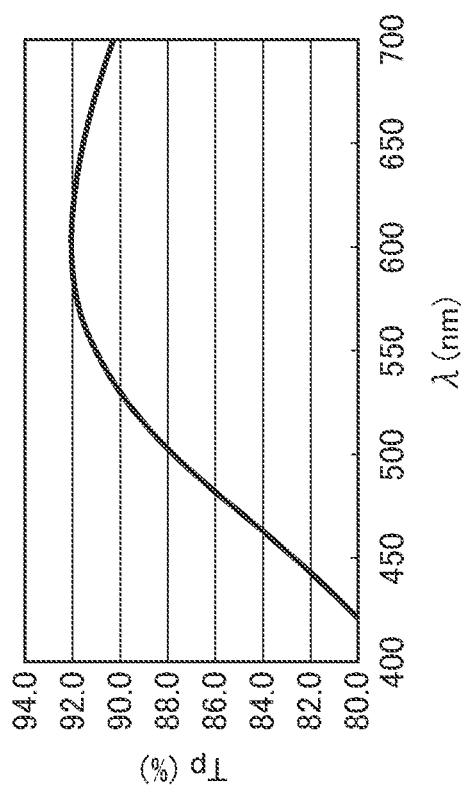
Figure 12C:
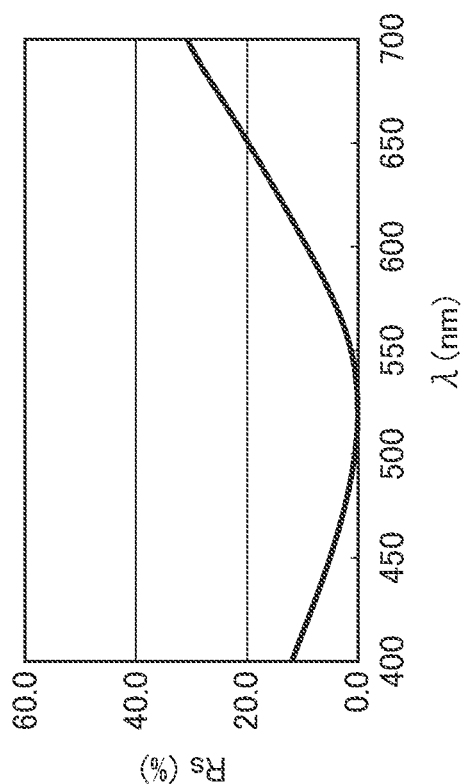
Figure 12D:
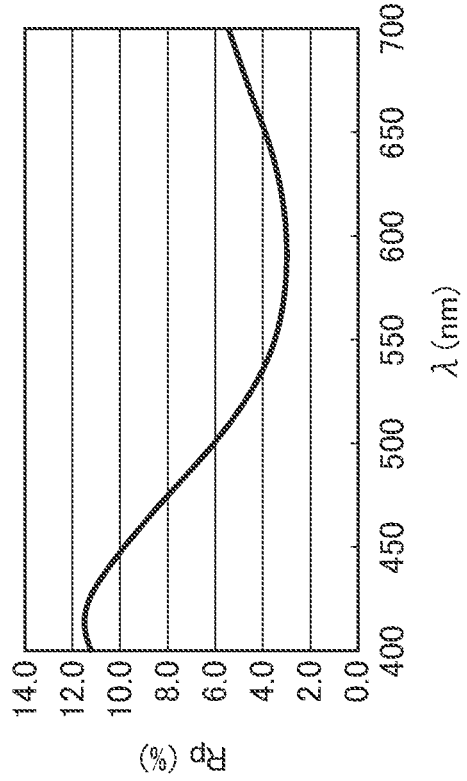

The polarization plate 600 was subjected to the simulation, and a transmission axis transmittance (Tp), an absorption axis transmittance (Ts), a transmission axis reflectance (Rp), and an absorption axis reflectance (Rs) were obtained. A relationship between a wavelength and a transmission axis transmittance (Tp) is illustrated in FIG. 12A, a relationship between a wavelength and an absorption axis transmittance (Ts) is illustrated in FIG. 12B, a relationship between a wavelength and an absorption axis reflectance (Rs) is illustrated in FIG. 12C, and a relationship between a wavelength and an absorption axis reflectance (Rs) is illustrated in FIG. 12D.

It is determined that the dielectric absorption layer is formed on the reflection layer 2 that is covered with the metal-oxide film 3, and thus, it is possible to control the polarization properties, and in the polarization plate 600 set in Example 3, S-polarized light is absorbed in a green band

TABLE 3

| Convex structure | | | | | Transmission axis transmittance (%) | | | Absorption axis transmittance (%) | | |
|---|---|---|---|---|---|---|---|---|---|---|
| Pitch width (nm) | Line width (nm) | Height of convex portion (nm) | Aspect ratio | Thickness of dielectric layer on convex portion (nm) | λ= 430~510 nm | λ= 520~590 nm | λ= 600~680 nm | λ= 430~510 nm | λ= 520~590 nm | λ= 600~680 nm |
| 50 | 25 | 180 | 7.2 | 12 | 83.9 | 93.5 | 92.7 | 0.012 | 0.006 | 0.004 |
| 50 | 25 | 160 | 6.4 | 140 | 82.6 | 92.8 | 91.9 | 0.040 | 0.016 | 0.011 |
| 50 | 25 | 140 | 5.6 | 10 | 83.5 | 90.7 | 90.1 | 0.153 | 0.064 | 0.037 |
| 50 | 30 | 120 | 4.0 | 30 | 76.0 | 88.1 | 86.3 | 0.104 | 0.048 | 0.029 |
| 50 | 30 | 100 | 3.3 | 50 | 88.3 | 92.0 | 88.8 | 0.424 | 0.255 | 0.160 |
| 50 | 30 | 80 | 2.7 | 80 | 89.4 | 92.5 | 90.2 | 1.235 | 0.989 | 0.704 |
| 50 | 30 | 60 | 2.0 | 90 | 87.7 | 92.4 | 90.7 | 3.958 | 3.322 | 2.736 |

Example 3

Figure 11:
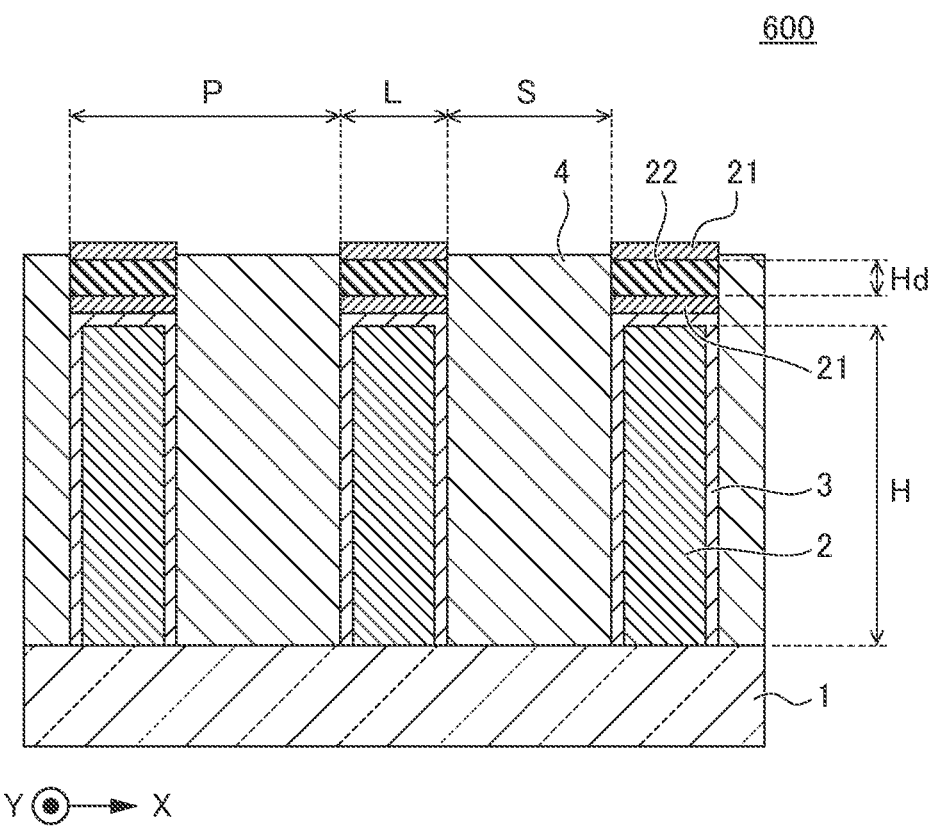
FIG. 11 is a sectional schematic view of a polarization plate according to one embodiment of the present invention.

In Example 3, a polarization plate 600 having a structure illustrated in FIG. 11 was set. In the polarization plate 600 set in Example 3, a dielectric absorption layer that is a multi-layer film of three layers including an absorption layer 22 interposed between two gap layers 21 is formed on the reflection layer 2 that is covered with the metal-oxide film 3. That is, the gap layer 21 that is a dielectric film is provided on the reflection layer 2 that is covered with the metal-oxide film 3, and the absorption layer 22 is laminated thereon, and the gap layer 21 is further laminated thereon.

The simulation was performed in a condition where the transparent substrate 1 was alkali-free glass having a thickness of 0.7 mm, the material of the reflection layer 2 was aluminum, the metal-oxide film 3 was aluminum oxide, the material of the gap layer 21 was $SiO_2$, the material of the absorption layer 22 was an alloy (FeSi) of Si and Fe, and the dielectric material of the dielectric layer 4 for fixing the convex portion was $SiO_2$. Note that, the thickness of the metal-oxide film 3 covering the reflection layer 2 was 5 nm.

In addition, the width of the pitch P of the convex portions of the polarization plate 600 was 50 nm, the line width W of the convex portion was 25 nm, the space width S of the convex portion was 25 nm, the height of the convex portion was 150 nm (including the height of the metal-oxide film 3 of 5 nm), the thickness of the gap layer 21 was 5 nm, and the (Wavelength λ=520 nm to 590 nm), and the absorption axis reflectance (Rs) decreases in the green band (Wavelength λ=520 nm to 590 nm).

Example 4

In Example 4, the polarization plate 200 having a structure illustrated in FIG. 2 was set. The convex portion includes the reflection layer 2 that is covered with the metal-oxide film 3, and the air layer 5 is provided in the dielectric material filling the gap between the adjacent convex portions. The air layer 5 is a layer that is arranged on the transparent substrate and forms the plurality of grid-shaped convex portions extending in the predetermined direction.

The simulation was performed in a condition where the transparent substrate 1 was alkali-free glass having a thickness of 0.7 mm, the material of the reflection layer 2 was aluminum, the metal-oxide film 3 was aluminum oxide, and the dielectric material of the dielectric layer 4 for fixing the convex portion was $SiO_2$. Note that, the thickness of the metal-oxide film 3 covering the reflection layer 2 was 5 nm.

In addition, the width of the pitch P of the convex portions of the polarization plate 200 was 50 nm, the line width W of the convex portion was 25 nm, the space width S of the convex portion was 25 nm, the height of the convex portion was 140 nm (including the height of the metal-oxide film 3 of 5 nm), the height Ha of the dielectric layer from the top of the convex portion was 10 nm, the width of the air layer 5 was 5 nm, and the height of the air layer 5 was 140 nm. Therefore, the aspect ratio of the convex portion is 5.6.

The polarization plate 200 was subjected to the simulation, and a transmission axis transmittance (a P polarization transmittance) and an absorption axis transmittance (an S polarization transmittance) were obtained. Simultaneously, for the comparison, the polarization plate 100 having the same setting as that of the polarization plate 200, except that air layer was not provided, was also subjected to the simulation, and a transmission axis transmittance (a P polarization transmittance) and an absorption axis transmittance (an S polarization transmittance) were obtained. A relationship between a wavelength and a transmission axis transmittance (a P polarization transmittance) is illustrated in FIG. 13A, and a relationship between a wavelength and an absorption axis transmittance (an S polarization transmittance) is illustrated in FIG. 13B.

Figure 13A:
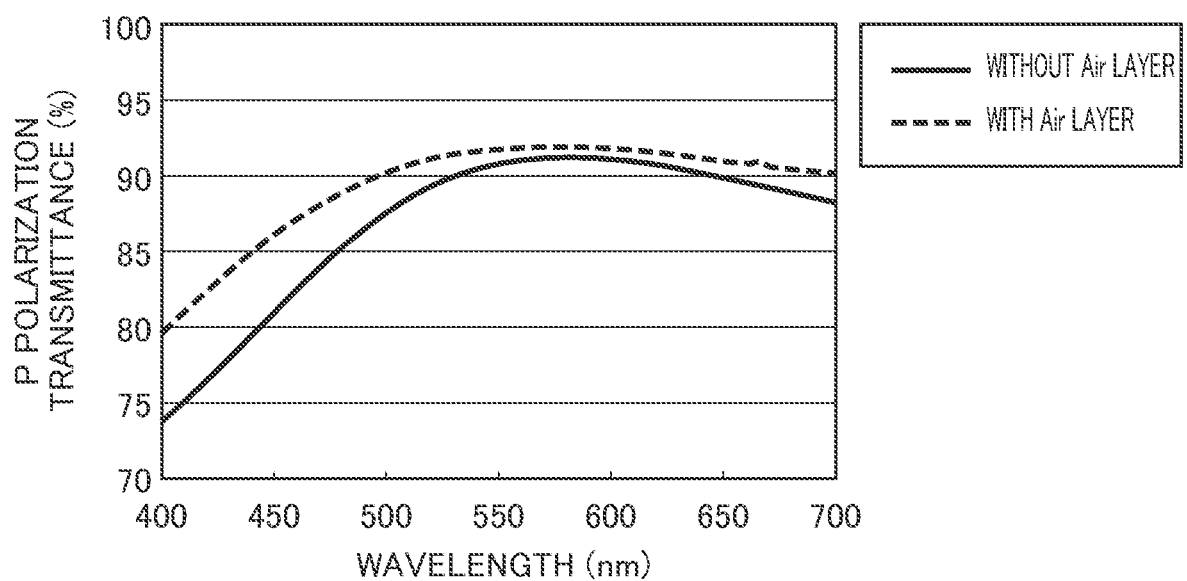
FIGS. 13A and 13B are graphs illustrating a relationship between a wavelength and a transmission axis transmittance or an absorption axis transmittance.
Figure 13B:
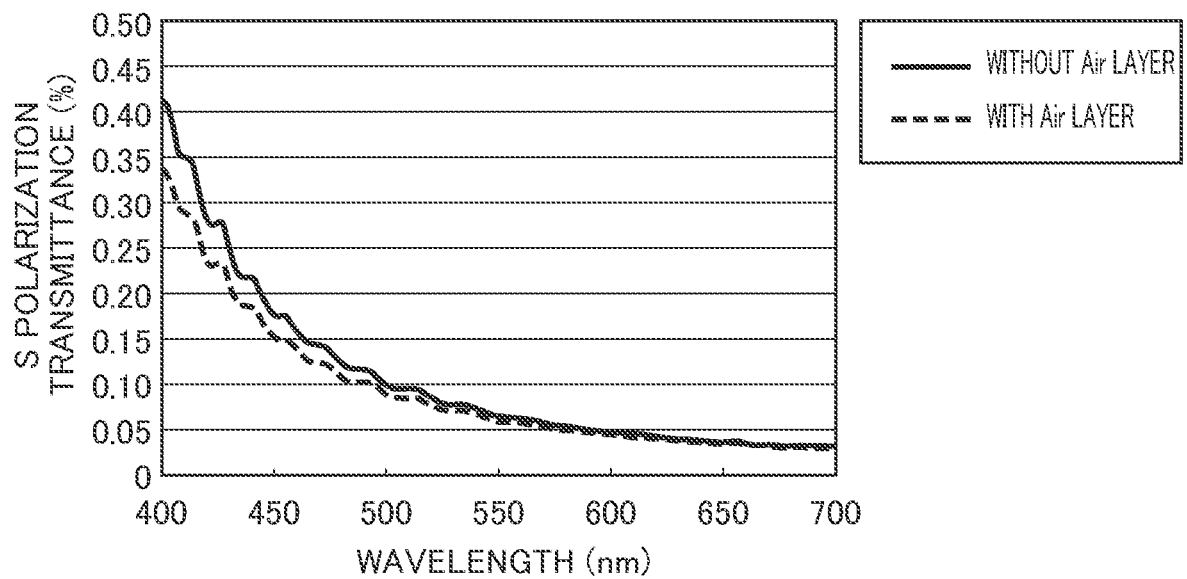

From FIGS. 13A and 13B, it is determined that in Example 4, the air layer 5 is provided in the gap between the convex portions of the polarization plate, and thus, it is possible to improve the transmission axis transmittance (the P polarization transmittance) and to decrease the absorption axis transmittance (the S polarization transmittance).

Example 5

In Example 5, the polarization plate 400 having a structure illustrated in FIG. 4 was set. The convex portion includes the reflection layer 2 that is covered with the metal-oxide film 3, the gap between the adjacent convex portions is filled with the dielectric material, and the array including the convex portions is included in the dielectric layer 4 containing the dielectric material that fills the gap between the convex portions. Then, the plurality of concave portions 7 extending in the predetermined direction are provided on the surface of the dielectric layer 4. The plurality of concave portions 7 are formed on the surface of the dielectric layer 4, and are approximately parallel to the plurality of grid-shaped convex portions extending in the predetermined direction.

The simulation was performed in a condition where the transparent substrate 1 was alkali-free glass having a thickness of 0.7 mm, the material of the reflection layer 2 was aluminum, the metal-oxide film 3 was aluminum oxide, and the dielectric material of the dielectric layer 4 for fixing the convex portion was SiO$_2$. Note that, the thickness of the metal-oxide film 3 covering the reflection layer 2 was 5 nm.

In addition, the width of the pitch P of the convex portions of the polarization plate 400 was 50 nm, the line width W of the convex portion was 25 nm, the space width S of the convex portion was 25 nm, the height of the convex portion was 160 nm (including the height of the metal-oxide film 3 of 5 nm), the height Hb of the dielectric layer from the top of the convex portion was 140 nm, the height of the concave portion 7 was 20 nm, and the width of the concave portion 7 was 25 nm. Therefore, the aspect ratio of the convex portion is 6.4.

The polarization plate 400 was subjected to the simulation, and a transmission axis transmittance (a P polarization transmittance) and an absorption axis transmittance (an S polarization transmittance) were obtained. Simultaneously, for the comparison, the polarization plate 100 having the same setting as that of the polarization plate 400, except that the plurality of concave portions 7 were not provided, was also subjected to the simulation, and a transmission axis transmittance (a P polarization transmittance) and an absorption axis transmittance (an S polarization transmittance) were obtained. A relationship between a wavelength and a transmission axis transmittance (a P polarization transmittance) is illustrated in FIG. 14A, and a relationship between a wavelength and an absorption axis transmittance (an S polarization transmittance) is illustrated in FIG. 14B.

Figure 14A:
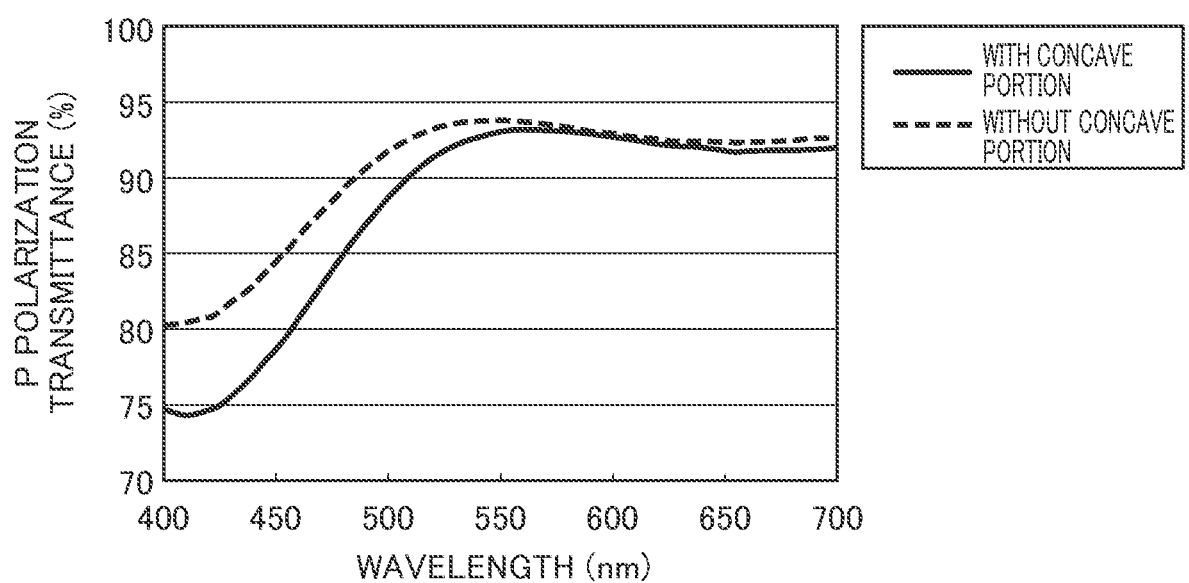
FIGS. 14A and 14B are graphs illustrating the relationship between the wavelength and the transmission axis transmittance or the absorption axis transmittance.
Figure 14B:
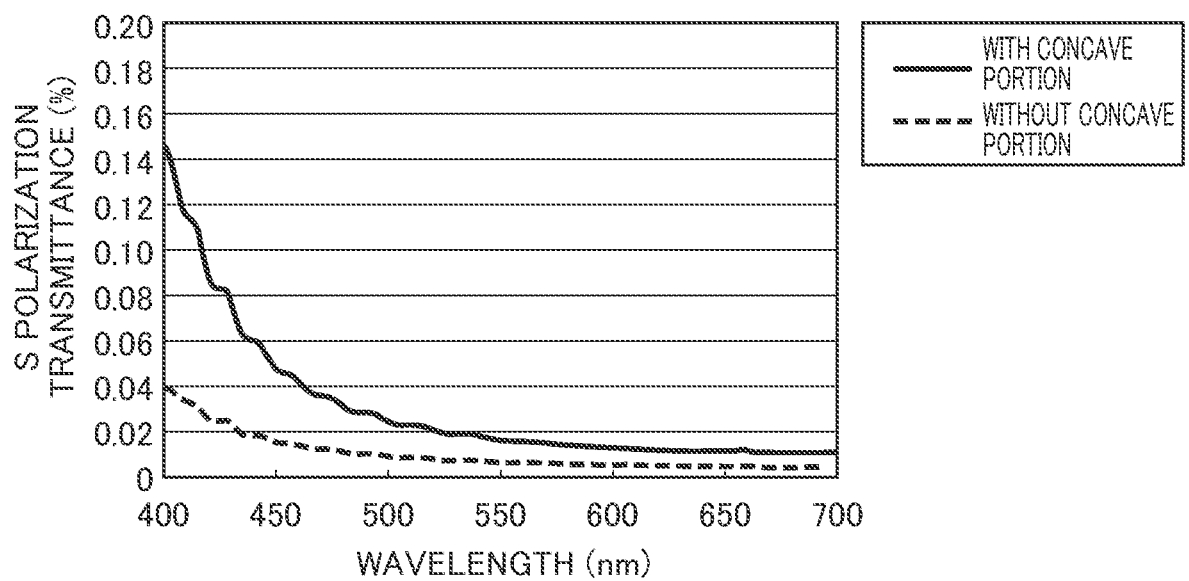

From FIGS. 14A and 14B, it is determined that in Example 5, the concave portions 7 are provided on the surface of the dielectric layer 4, and thus, it is possible to improve the transmission axis transmittance (the P polarization transmittance) and to decrease the absorption axis transmittance (the S polarization transmittance).

What is claimed is:
1. A polarization plate having a wire grid structure, the polarization plate comprising:
  a transparent substrate; and
  an array including a plurality of grid-shaped convex portions that are arranged on the transparent substrate at a pitch of greater than or equal to 30 nm and less than or equal to 100 nm and extend in a predetermined direction,
  wherein the plurality of grid-shaped convex portions include at least a reflection layer, and have an aspect ratio of greater than or equal to 3 and less than or equal to 15,
  a gap between the adjacent convex portions among the plurality of grid-shaped convex portions is filled with a dielectric material,
  the array is fixed in a dielectric layer containing the dielectric material, and
  the dielectric layer has, on a surface facing away from the transparent substrate, a plurality of concave portions extending approximately parallel to the predetermined direction in which the plurality of grid-shaped convex portions extend,
  wherein a respective concave portion among the plurality of concave portions has a width approximately the same as that of the convex portion, and
  wherein the respective concave portion has a depth of 10 nm to 50 nm.
2. The polarization plate according to claim 1,
  wherein a gas layer extending in a predetermined direction is provided in the dielectric material in the gap between the adjacent convex portions.
3. The polarization plate according to claim 1, further comprising:
  an antireflection layer on the dielectric layer.
4. The polarization plate according to claim 1,
  wherein the convex portion further includes a dielectric absorption layer on the reflection layer.
5. The polarization plate according to claim 1,
  wherein a surface of the polarization plate on which incident light enters is covered with a protective film containing a dielectric.
6. The polarization plate according to claim 1,
  wherein a surface of the polarization plate on which incident light enters is covered with an organic water-repellent film.
7. An optical apparatus, comprising:
  the polarization plate according to claim 1.
8. A manufacturing method of the polarization plate according to claim 1, the method comprising:
  a block copolymer arranging step of allowing a block copolymer forming arrangement by self-assembling performance to be self-assembled on a reflection layer of a laminate including a transparent substrate and the reflection layer, and of forming a periodic lamellar structure;

a mask forming step of forming a mask including a plurality of grid-shaped convex portions that are arranged at a pitch of greater than or equal to 30 nm and less than or equal to 100 nm and extend in a predetermined direction, by selectively removing a specific polymer block chain of the arranged block copolymer;

an array forming step of forming an array including a plurality of grid-shaped convex portions that include at least a reflection layer, are arranged at a pitch of greater than or equal to 30 nm and less than or equal to 100 nm, and extend in a predetermined direction, by performing etching with the mask; and a convex portion fixing step of fixing the array including the convex portions that include at least the reflection layer, in a dielectric layer containing a dielectric material.

* * * * *